United States Patent
Matsumura et al.

(10) Patent No.: US 11,502,378 B2
(45) Date of Patent: Nov. 15, 2022

(54) CONNECTION MODULE AND ELECTRICITY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nobuyuki Matsumura, Mie (JP); Shinichi Takase, Mie (JP); Hiroki Shimoda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 162 days.

(21) Appl. No.: 17/044,575

(22) PCT Filed: Apr. 3, 2019

(86) PCT No.: PCT/JP2019/014807
§ 371 (c)(1),
(2) Date: Oct. 1, 2020

(87) PCT Pub. No.: WO2019/202991
PCT Pub. Date: Oct. 24, 2019

(65) Prior Publication Data
US 2021/0203039 A1     Jul. 1, 2021

(30) Foreign Application Priority Data

Apr. 16, 2018   (JP) .............................. JP2018-078156

(51) Int. Cl.
| | |
|---|---|
| *H01M 50/503* | (2021.01) |
| *H01M 50/507* | (2021.01) |
| *H01M 50/209* | (2021.01) |

(52) U.S. Cl.
CPC ....... *H01M 50/503* (2021.01); *H01M 50/209* (2021.01); *H01M 50/507* (2021.01); *H01M 2220/20* (2013.01)

(58) Field of Classification Search
CPC ............................................ H01M 50/50–529
See application file for complete search history.

(56) References Cited

U.S. PATENT DOCUMENTS

| | | | |
|---|---|---|---|
| 6,261,719 B1 | 7/2001 | Ikeda et al. | |
| 2006/0246781 A1* | 11/2006 | Yoon ................... | H01M 50/502 439/627 |

(Continued)

FOREIGN PATENT DOCUMENTS

| | | |
|---|---|---|
| JP | 3707595 | 10/2005 |
| JP | 2012-138333 | 7/2012 |

(Continued)

OTHER PUBLICATIONS

Official Communication issued in International Bureau of WIPO Patent Application No. PCT/JP2019/014807, dated Jun. 25, 2019, along with an English translation thereof.

*Primary Examiner* — Jonathan Crepeau
*Assistant Examiner* — Jacob Buchanan
(74) *Attorney, Agent, or Firm* — Greenblum & Bernstein, P.L.C.

(57) ABSTRACT

A connection module can be attached to an electricity storage element group in which a plurality of electricity storage elements each including a positive and a negative electrode terminal are aligned, the connection module including: a bus bar including a pair of terminal connection portions that are to be respectively connected to the electrode terminals of the adjacent electricity storage elements; and an insulating protector that is to be fixed to the electricity storage element group, wherein the insulating protector includes an accommodation frame inside of which the bus bar is disposed; and retaining portions that prevent the bus bar from coming off in the left-right direction inside the accommodation frame, and a tolerance absorbing clearance is provided between each of the retaining portions and the bus bar.

8 Claims, 23 Drawing Sheets

(56) References Cited

U.S. PATENT DOCUMENTS

| | | | |
|---|---|---|---|
| 2013/0071721 A1* | 3/2013 | Ogasawara | H01M 50/502 429/151 |
| 2013/0280959 A1* | 10/2013 | Takase | H01M 50/20 439/627 |
| 2014/0329413 A1 | 11/2014 | Ogasawara et al. | |
| 2015/0086844 A1 | 3/2015 | Masuda | |
| 2015/0214534 A1 | 7/2015 | Callicoat et al. | |
| 2015/0243947 A1* | 8/2015 | Seto | H01M 50/249 429/158 |
| 2017/0149225 A1* | 5/2017 | Imai | H02G 5/025 |
| 2018/0309113 A1 | 10/2018 | Nakayama et al. | |
| 2020/0075914 A1* | 3/2020 | Mori | H01M 50/505 |

FOREIGN PATENT DOCUMENTS

| | | |
|---|---|---|
| JP | 2013-157125 | 8/2013 |
| JP | 2015-088464 | 5/2015 |
| JP | 2016-100247 | 5/2016 |

* cited by examiner

CONNECTION MODULE AND ELECTRICITY STORAGE MODULE

TECHNICAL FIELD

A technique disclosed by the present specification relates to a connection module and an electricity storage module that can be attached to an electricity storage element group.

BACKGROUND ART

For example, Japanese Patent No. 3707595 (Patent Document 1 below) is known as a connection module that can be attached to an electricity storage element group mounted in a vehicle. This connection module includes a bus bar through which electrode terminals provided so as to protrude from adjacent electricity storage elements of a plurality of electricity storage elements that constitute an electricity storage element group are passed and bolted, and a synthetic resin substrate portion that holds the bus bar. Since the intervals between the electrode terminals of the adjacent electricity storage elements (inter-electrode pitches) vary, the substrate portion is provided with a slit, and the inter-electrode pitches are adjusted by the peripheral portion of the slit in the substrate portion being bent.

CITATION LIST

Patent Documents

Patent Document 1: Japanese Patent No. 3707595

SUMMARY OF INVENTION

Technical Problem

Meanwhile, if the electrode terminals are flat, the electrode terminals cannot be passed through the bus bar in the manner described above. Accordingly, the bus bar cannot be positioned relative to the electrode terminals, and the substrate portion that holds the bus bar also cannot be positioned relative to the electricity storage element group. In addition, the electrode terminals of the electricity storage elements may undergo variation also in the height positions thereof, and there is a great demand for measures against such variation.

The present specification discloses a technique for preventing an attachment operation failure due to a dimensional difference or the like by suppressing the positional displacement between electrode terminals and a bus bar.

Solution to Problem

The technique disclosed by the present specification is configured as a connection module that can be attached to an electricity storage element group in which a plurality of electricity storage elements each including a positive and a negative electrode terminal are aligned, the connection module including: a bus bar including a pair of terminal connection portions that are to be respectively placed on the electrode terminals of the adjacent electricity storage elements, and being configured to electrically connect the adjacent electricity storage elements by the pair of terminal connection portions being connected to the electrode terminals; and an insulating protector that is to be fixed on the electrode terminal side of the electricity storage element group while holding the bus bar, wherein the insulating protector includes an accommodation frame inside of which the bus bar is disposed, and retaining portions that prevent the bus bar from coming off in an arrangement direction of the electricity storage elements inside the accommodation frame, and a clearance is provided between each of the retaining portions and the bus bar, the clearance being configured such that, in a state in which one of the terminal connection portions of the bus bar inside the accommodation frame is disposed on a first end face of the accommodation frame that is different from an end face thereof located on the electrode terminal side, the other terminal connection portion of the bus bar can be disposed on a second end face of the accommodation frame on the electrode terminal side that is located opposite to the first end face.

With the connection module having such a configuration, a clearance is provided between each of the retaining portions and the bus bar, and the bus bar retained by the retaining portions can be disposed between the first end face and the second end face of the accommodation frame so as to be inclined in the up-down direction when attaching the connection module to the electricity storage element group. Accordingly, it is possible to absorb the positional displacement in the height direction due to a dimensional error or the like between the electrode terminals of the adjacent electricity storage elements. This can prevent an attachment operation failure due to a dimensional error or the like in the height direction between the electrode terminals when attaching the connection module to the electricity storage element group.

The connection module disclosed by the present specification may have the following configuration.

The retaining portions may be provided over the entire height of the accommodation frame so as to protrude inward from a pair of inner surfaces of the accommodation frame that are opposed to each other in a direction orthogonal to the arrangement direction, and a pair of fitting recesses to which the retaining portions are fitted may be provided at a central portion, in the arrangement direction, of side surfaces of the bus bar that are opposed to the pair of inner surfaces.

As the means for retaining the bus bar by the retaining portions, it is conceivable to adopt, for example, a method in which fitting projections are provided on the bus bar, and fitting grooves to which fitting projections are fitted are provided in the inner surfaces of the accommodation frame. However, in the case of forming fitting grooves in the accommodation frame, the plate thickness of the accommodation frame needs to be larger than the depth dimension of the fitting grooves, so that the size of the accommodation frame and hence the size of the insulating protector tend to be increased. In contrast, with the above-described configuration, the fitting recesses of the bus bar are fitted to the retaining portions protruding from the accommodation frame, and it is therefore possible to retain the bus bar by the retaining portions, while suppressing an increase in the size of the accommodation frame.

A dimensional difference between a height dimension of each of the retaining portions and a thickness dimension of the bus bar may be set to be larger than a difference between height positions of portions of the electrode terminals of the adjacent electricity storage elements where the bus bar is to be disposed.

With such a configuration, the movable range of the bus bar in the up-down direction inside the accommodation frame is larger than the difference between height positions of the portions of the electrode terminals of the adjacent electricity storage elements where the bus bar is to be disposed. Accordingly, the positional displacement of the height positions due to a dimensional error or the like of the portions of the electrode terminals of the adjacent electricity storage elements where the bus bar is to be disposed can be absorbed as compared with, for example, a case where the difference between the height positions of the portions of the electrode terminals of the adjacent electricity storage elements where the bus bar is to be placed is larger than the movable range of the bus bar in the up-down direction.

Each of the retaining portions may have a semicylindrical shape with a protruding surface having a circular arc shape, and each of the fitting recesses may be recessed so as to extend along the protruding surface of the corresponding retaining portion.

With such a configuration, the protruding surface of each of the retaining portions has a circular arc shape, and each of the fitting recesses has a shape extending along the corresponding retaining portion. Accordingly, the bus bar can be smoothly moved in the up-down direction along the retaining portions as compared with a case where the retaining portions have an angular protruding surface, for example.

The technique disclosed by the present specification may be configured as an electricity storage module including: an electricity storage element group in which a plurality of electricity storage elements each including a positive and a negative electrode terminal are aligned; and the above-described connection module, wherein each of the electricity storage elements includes an insulating support portion that surrounds and supports the electrode terminals, the accommodation frame is provided with a positioning portion configured to be fitted between the insulating support portions of the adjacent electricity storage elements so as to position the accommodation frame relative to the electricity storage elements, and the insulating protector is provided so as to be continuous with the adjacent accommodation frames, and includes coupling portions configured to expand or contract in the arrangement direction when the accommodation frames are positioned relative to the electricity storage elements.

With the electricity storage module having such a configuration, even when there is variation in the gap between the accommodation frames due to a dimensional error or the like in the arrangement direction of the electricity storage elements when mounting the insulating protector to the electricity storage element group, the size of the gap between the adjacent accommodation frames can be varied by the coupling portions expanding or contracting when attaching the connection module to the electricity storage element group, so that the dimensional error between the adjacent accommodation frames can be absorbed. This can prevent an attachment operation failure due to a dimensional error or the like in the arrangement direction of the electricity storage elements when attaching the connection module to the electricity storage element group.

Each of the coupling portions may be provided between and so as to be continuous with a pair of opposing wall portions of the adjacent accommodation frames, and may be disposed so as to be bent between the adjacent accommodation frames.

With such a configuration, the coupling portions are disposed between the adjacent accommodation frames, and it is therefore possible to suppress an increase in the size of the connection module and hence the size of the electricity storage module as compared with a case where the coupling portions protrude outward from between the accommodation frames, for example.

The coupling portions may be respectively provided at opposite ends of the pair of wall portions of the accommodation frames.

For example, when the coupling portions are provided at only one end of the pair of wall portions, the coupling portions may be damaged due to plastic deformation or the like if the other ends of the adjacent accommodation frames open so as to move away from each other. However, with the above-described configuration, the coupling portions are provided at opposite ends of the pair of wall portions. Accordingly, it is possible to prevent the adjacent accommodation frames from opening so as to move away from each other, thus preventing the coupling portions from being damaged.

Advantageous Effects of Invention

According to the technique disclosed by the present specification, it is possible to prevent an attachment operation failure due to a dimensional difference or the like by suppressing the positional displacement between electrode terminals and a bus bar.

DESCRIPTION OF EMBODIMENTS

An embodiment of the technique disclosed in the present specification will be described with reference to FIGS. 1 to 22.

Figure 1:
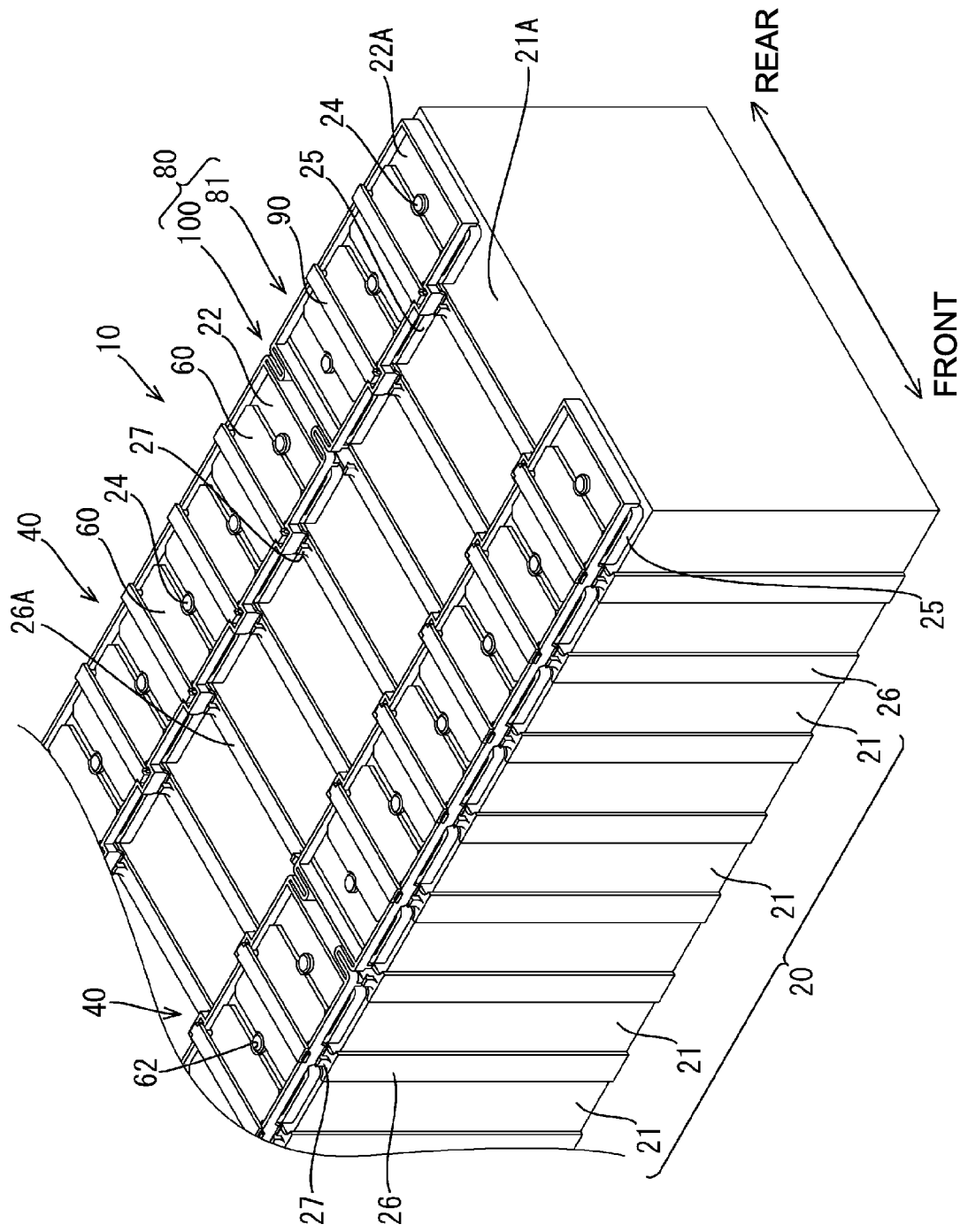
FIG. 1 is a perspective view of an electricity storage module according to an embodiment.

The present embodiment is directed to an electricity storage module 10 that can be mounted in a vehicle such as an electric automobile or a hybrid automobile, and the electricity storage module 10 includes an electricity storage element group 20 including a plurality of electricity storage elements 21 aligned in the left-right direction, and connection modules 40 that can be attached to the electricity storage element group 20, as shown in FIG. 1.

Figure 2:
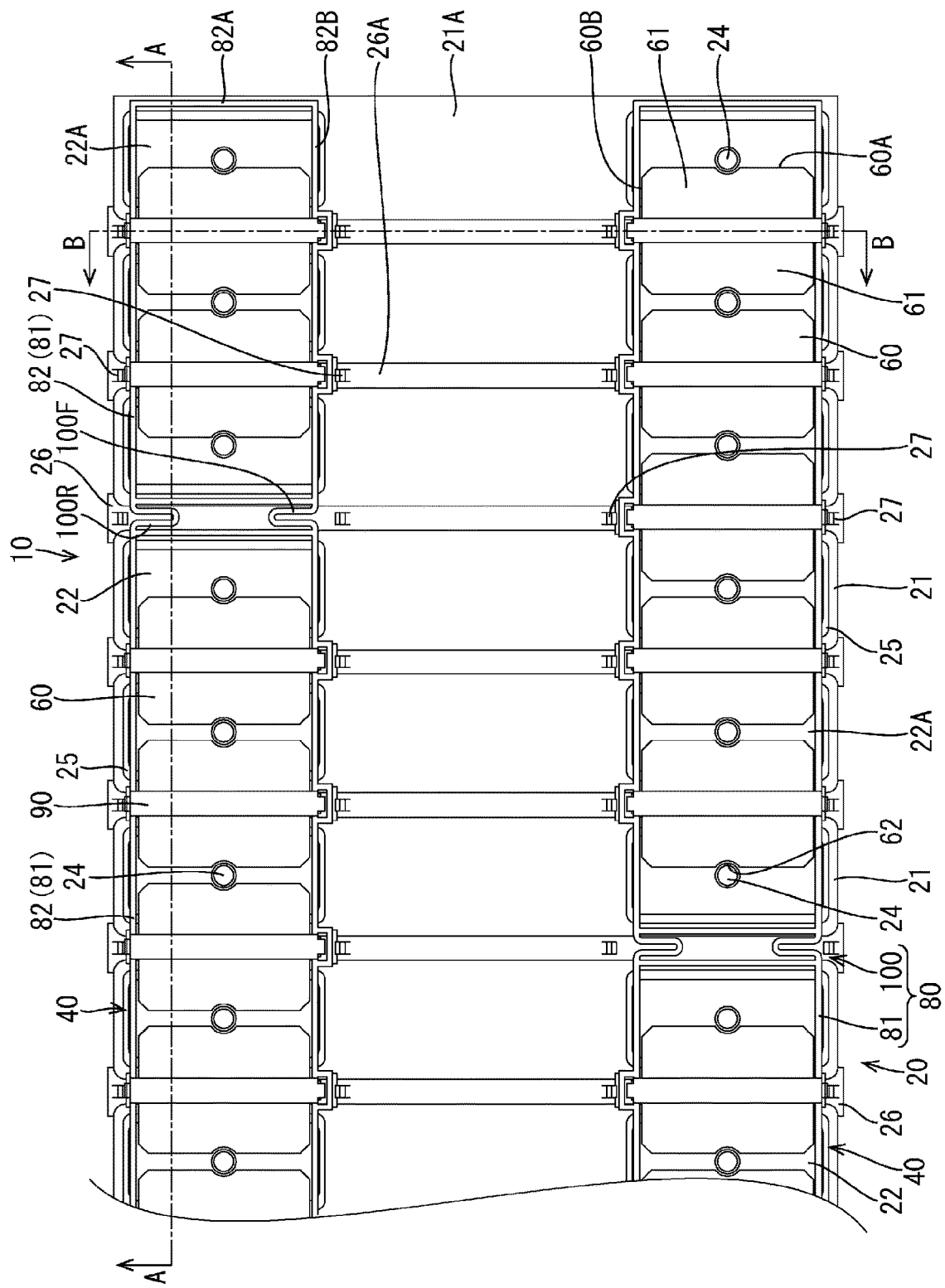
FIG. 2 is a plan view of the electricity storage module.

Each electricity storage element 21 is a secondary battery, and is formed in a flat, rectangular parallelepiped shape that is elongated in the front-rear direction, as shown in FIGS. 1 and 2. A pair of electrode terminals 22 are provided on an upper surface 21A of the electricity storage element 21 at positions close to opposite ends in the front-rear direction. One of the pair of electrode terminals 22 serves as a positive electrode terminal, and the other serves as a negative electrode terminal.

Each electrode terminal 22 has a substantially rectangular shape that is slightly elongated in the front-rear direction. The upper portion of each electrode terminal 22 is formed to be horizontal, and a protrusion 24 slightly protruding upward from the electrode terminal 22 is provided on an upper surface 22A of the electrode terminal 22 so as to be integrated with the electrode terminal 22.

The protrusion 24 has a substantially cylindrical shape, and is disposed at a substantially central portion of the electrode terminal 22 in the front-rear direction and the left-right direction.

Each electrode terminal 22 is supported by an insulating support portion 25 that is made of a synthetic resin and that surrounds the entire circumference of a side surface of the electrode terminal 22, in a state in which an upper end portion of the electrode terminal 22 protrudes slightly upward.

In the electricity storage element group 20, the electricity storage elements 21 are disposed in units of a predetermined number of (three in the present embodiment) electricity storage elements 21 such that the electrode terminals 22 have opposite polarities, and are aligned with a flat plate-shaped insulating separator 26 made of a synthetic resin disposed between the adjacent electricity storage elements 21.

Each insulating separator 26 is disposed along a surface 21B on which the adjacent electricity storage elements 21 are opposed to each other. An upper end portion (an end portion on the side on which the electrode terminals 22 of the electricity storage elements 21 are disposed) of the insulating separator 26 is configured to protrude from both sides in the arrangement direction of the electricity storage elements 21, and an upper surface 26A of the insulating separator 26 is formed as a horizontal surface extending along the arrangement direction of the electricity storage element 21. Accordingly, inter-element recesses 28 each having a substantially rectangular shape in a side view and composed of the respective insulating support portion 25 of the adjacent electricity storage elements 21 and the upper surface 26A of the insulating separator 26 are formed in the upper portion of the electricity storage element group 20.

As shown in FIGS. 1 to 8, the connection modules 40 can be attached to the upper portion of the electricity storage element group 20, and are mounted so as to extend along two rows, respectively, of electrode terminals 22 aligned side by side in the left-right direction on the front and rear sides of the electricity storage element group 20 as shown in FIGS. 1 and 2. That is, in the electricity storage module 10 of the present embodiment, two connection modules 40 are mounted to the upper portion of the electricity storage element group 20 so as to be aligned on the front and rear sides thereof. Note that the two connection modules 40 mounted to the electricity storage element group 20 connect three electricity storage elements 21 in parallel to form one electricity storage unit, and connect the electricity storage units in series. The connection modules 40 partly differ from each other in the configuration of a bus bar holding portion 81 of an insulating protector 80, which will be described later, but are the same in the rest of the configuration. Therefore, the connection module 40 disposed on the rear side of the electricity storage element group 20 will be described as a representative example.

The connection module 40 includes bus bars 60 that each connect the electrode terminals 22 of the adjacent electricity storage elements 21 to each other, and insulating protectors 80 that hold the bus bars 60.

Each bus bar 60 is formed, for example, by pressing a metal plate having excellent conductivity such as copper, a copper alloy, aluminum, an aluminum alloy, or stainless steel (SUS).

Figure 20:
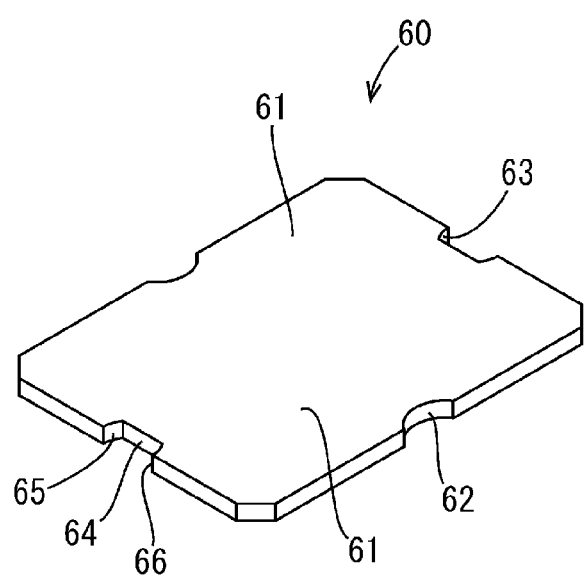
FIG. 20 is a perspective view of a bus bar.
Figure 21:
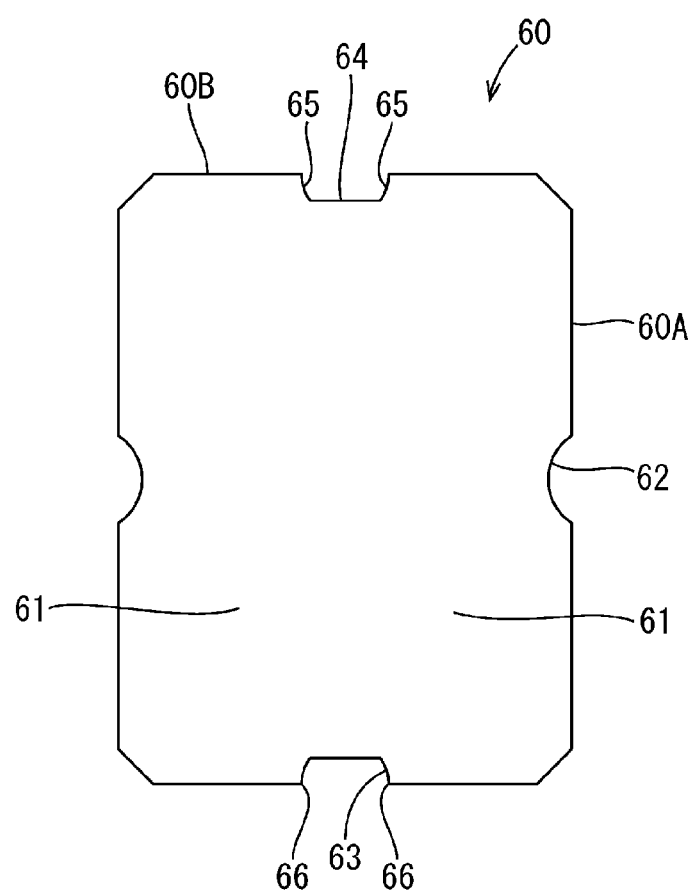
FIG. 21 is a plan view of the bus bar.

As shown in FIGS. 20 and 21, each bus bar 60 is formed in a substantially rectangular, slightly thick, flat plate-shape that is elongated in the front-rear direction, and opposite end portions of the bus bar 60 in the left-right direction serve as a pair of terminal connection portions 61 that are to be placed on and connected to the electrode terminals 22 of the electricity storage elements 21.

When the connection module 40 is mounted to the electricity storage element group 20, the pair of terminal connection portions 61 are placed on the electrode terminals 22 of the adjacent electricity storage elements 21. Then, the electrode terminals 22 of the electricity storage elements 21 are connected to the respective corresponding terminal connection portions 61, for example, by a known welding method such as laser welding, whereby the electrode terminals 22 of the adjacent electricity storage elements 21 are electrically connected to each other. Note that each of the terminal connection portions 61 of each bus bar 60 is formed to have a length dimension that is larger in the left-right direction than the sum of the maximum amount of variations in the interval (inter-electrode pitch) between the adjacent electrode terminals 22 and the length dimension, in the left-right direction, of a region of the corresponding electrode terminal 22 that is connected to the terminal connection portion 61, so that each terminal connection portion 61 is disposed on the corresponding electrode terminals 22 even if the inter-electrode pitch varies between the adjacent electricity storage elements 21 when the electricity storage elements 21 are aligned in the left-right direction.

As shown in FIG. 21, longitudinal outer surfaces 60A of the bus bar 60 that are located on the sides on which the pair of terminal connection portions 61 are disposed are each provided with a positioning recess 62 to which the protrusion 24 is fitted when the pair of terminal connection portions 61 are placed on the electrode terminals 22. Each positioning recess 62 is formed so as to be recessed from the corresponding longitudinal outer surface 60A of the bus bar 60 toward the center of the bus bar 60, and the inner circumferential surface of the positioning recess 62 is formed in a circular arc shape extending along the outer circumferential surface of the protrusion 24.

As shown in FIG. 2, each protrusion 24 is configured to be fitted to the positioning recesses 62 in a state in which a clearance is provided between the inner circumferential surface of each of the positioning recesses 62 and the outer circumferential surface of the protrusion 24. Also, when the pair of terminal connection portions 61 of the bus bar 60 are placed on the respective electrode terminals 22 of the adjacent electricity storage elements 21, although a clearance is provided between the inner circumferential surface of each of the positioning recesses 62 and the outer circumferential surface of the protrusion 24, the bus bar 60 and the protrusion 24 are locked to each other, thus preventing the terminal connection portions 61 of the bus bar 60 on the electrode terminals 22 of the electricity storage elements 21 from being positionally displaced forward, rearward, leftward, or rightward.

Each insulating protector 80 is made of a synthetic resin, has a form that is oblong in the left-right direction, and includes a bus bar holding portion 81 that holds a plurality of bus bars 60, and a coupling portion 100 that couples a plurality of bus bar holding portions 81 in the arrangement direction (left-right direction) of the electricity storage elements 21, as shown in FIGS. 1, 2, 9, and 10.

Figure 9:
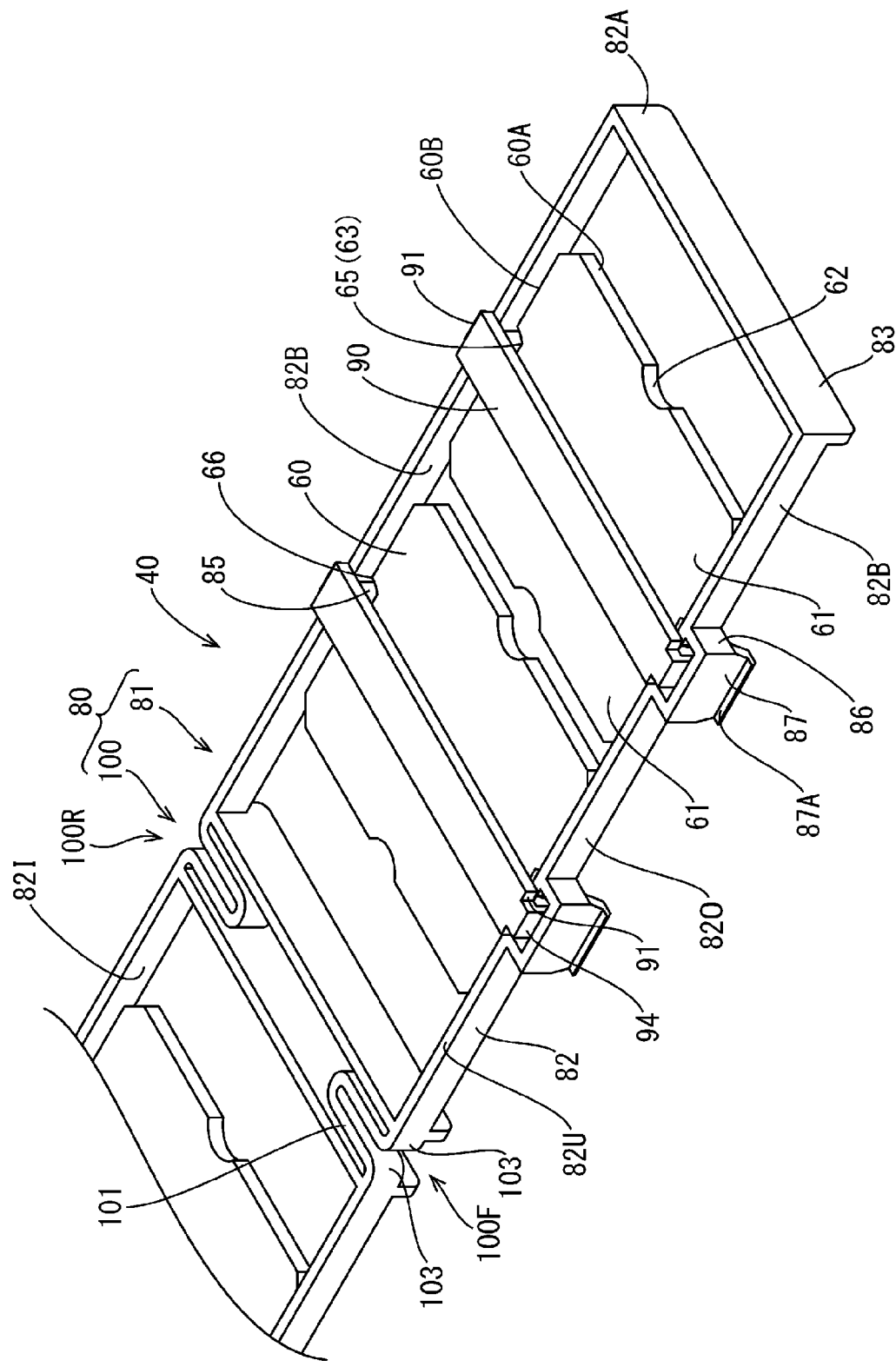
FIG. 9 is a perspective view of a connection module.

Each bus bar holding portion 81 has a flat, substantially rectangular shape that is elongated in the left-right direction, and includes an accommodation frame 82 that accommodates the bus bars 60, a plurality of support portions 84 that support the bus bars 60 accommodated inside the accommodation frame 82 from below, and a plurality of lid portions 90 that prevent the bus bars 60 accommodated inside the accommodation frame 82 from coming off, from above, i.e., in the direction opposite to the support portions 84, as shown in FIG. 9.

As shown in FIG. 2, each accommodation frame 82 is formed in a flat, substantially rectangular frame shape that is elongated in the left-right direction, and is configured such that a plurality of bus bars 60 are disposed inside the accommodation frame 82 so as to be aligned in the left-right direction. In the present embodiment, the bus bar holding portions 81 located at the right end and the left end (not shown), respectively, of the connection module 40 disposed on the rear side of the electricity storage element group 20 are each configured to hold three bus bars 60, and the bus bar holding portions 81 other than those located at the right end and the left end, respectively, of the connection module 40 disposed on the rear side of the electricity storage element group 20, and all the bus bar holding portions 81 of the connection module 40 disposed on the rear front side of the electricity storage element group 20 are each configured to hold five bus bars 60.

Figure 5:
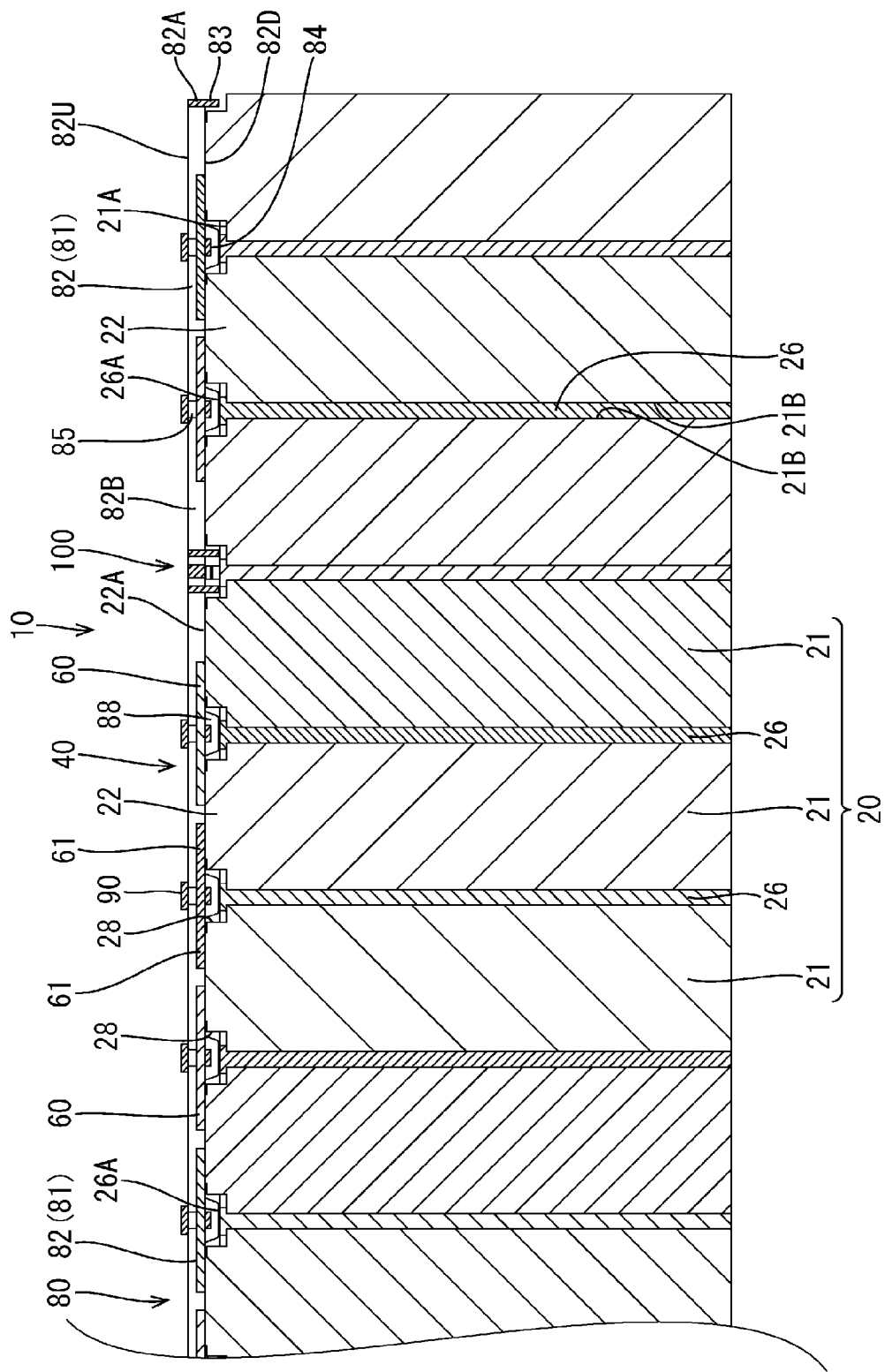
FIG. 5 is a cross-sectional view taken along the line A-A in FIG. 2.
Figure 6:
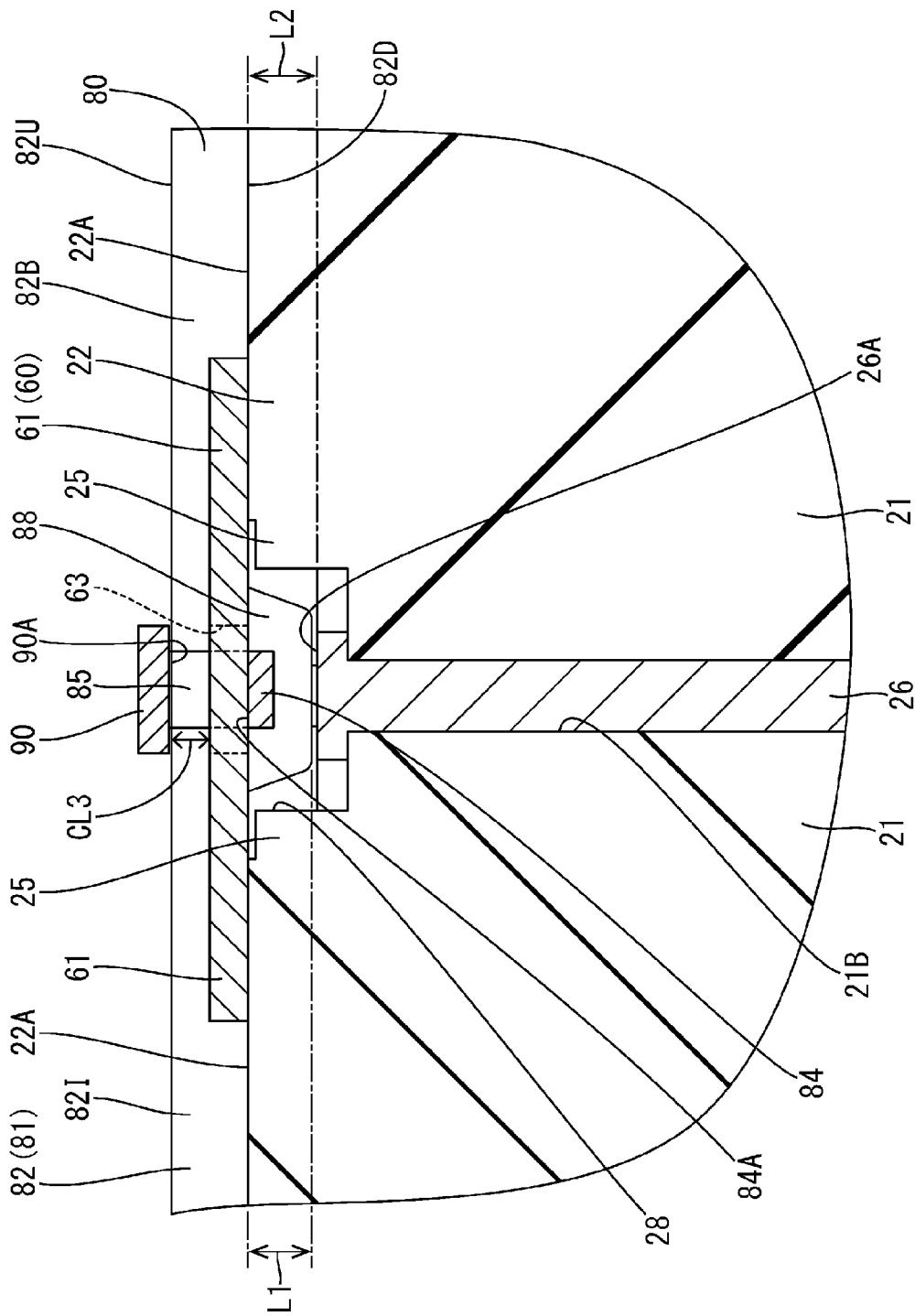
FIG. 6 is a partial enlarged cross-sectional view of FIG. 5.
Figure 10:
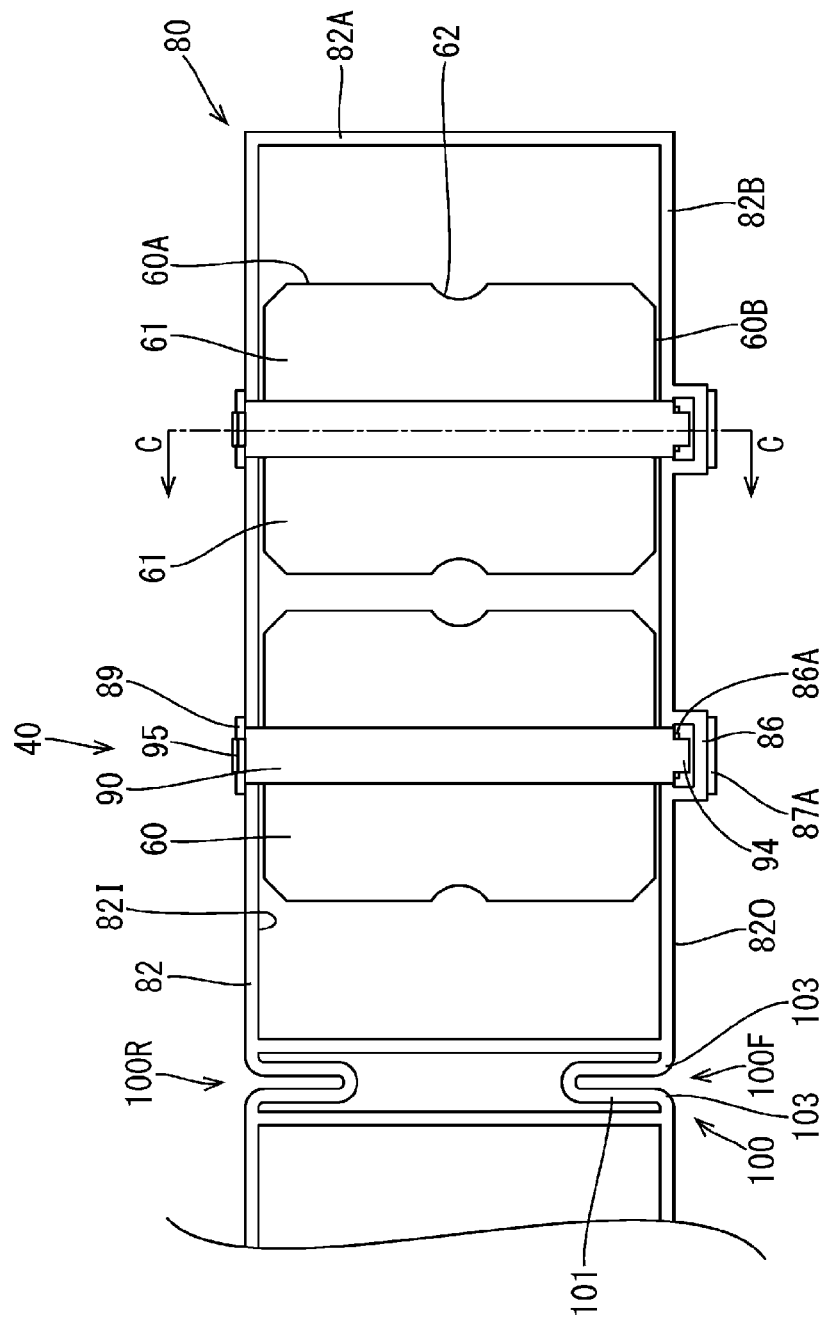
FIG. 10 is a plan view of the connection module.
Figure 11:
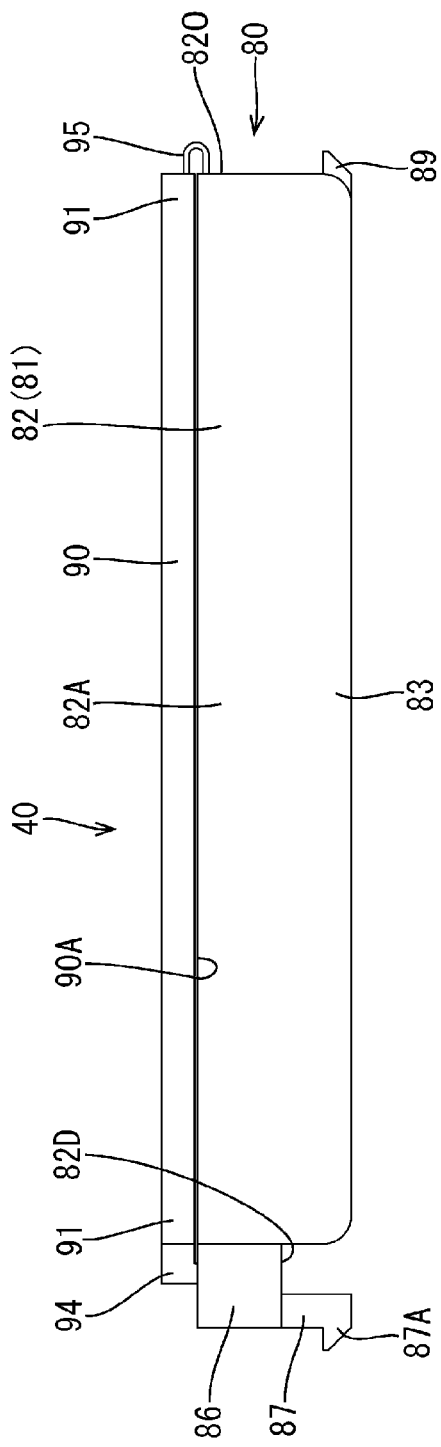
FIG. 11 is a front view of the connection module.
Figure 12:
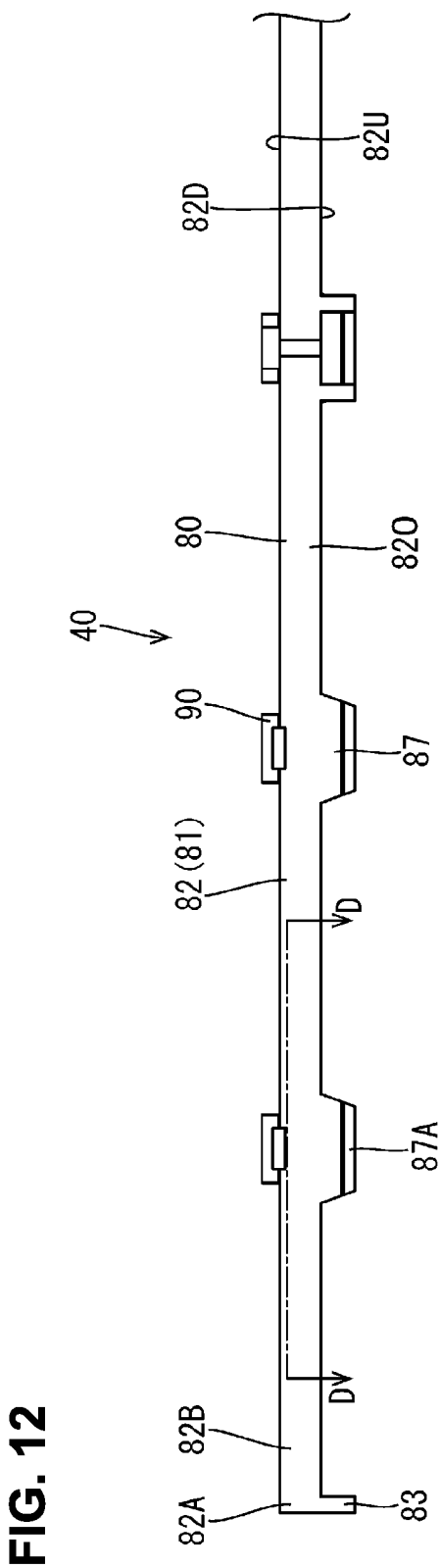
FIG. 12 is a side view of the connection module.

As shown in FIG. 10, the accommodation frame 82 is composed of a pair of long-side walls 82B extending in the arrangement direction of the electricity storage elements 21 and being opposed to each other in a direction orthogonal to the arrangement direction, and short-side walls (an example of "wall portion") 82A that couple the pair of long-side walls 82B in the direction orthogonal to the arrangement direction at opposite ends of the accommodation frame 82 in the left-right direction. As shown in FIGS. 5 and 9, a protruding piece 83 protruding below the long-side walls 82B of the accommodation frame 82 is provided at the lower portion of each of the short-side walls 82A. Each protruding piece 83 is configured to be lockable to an insulating support portion 25 of the electricity storage element 21 in the left-right direction in a state in which the connection module 40 is attached to the electricity storage element group 20, and thus can prevent the bus bar holding portion 81 from being positionally displaced relative to the electricity storage element group 20 in the left-right direction.

Figure 13:
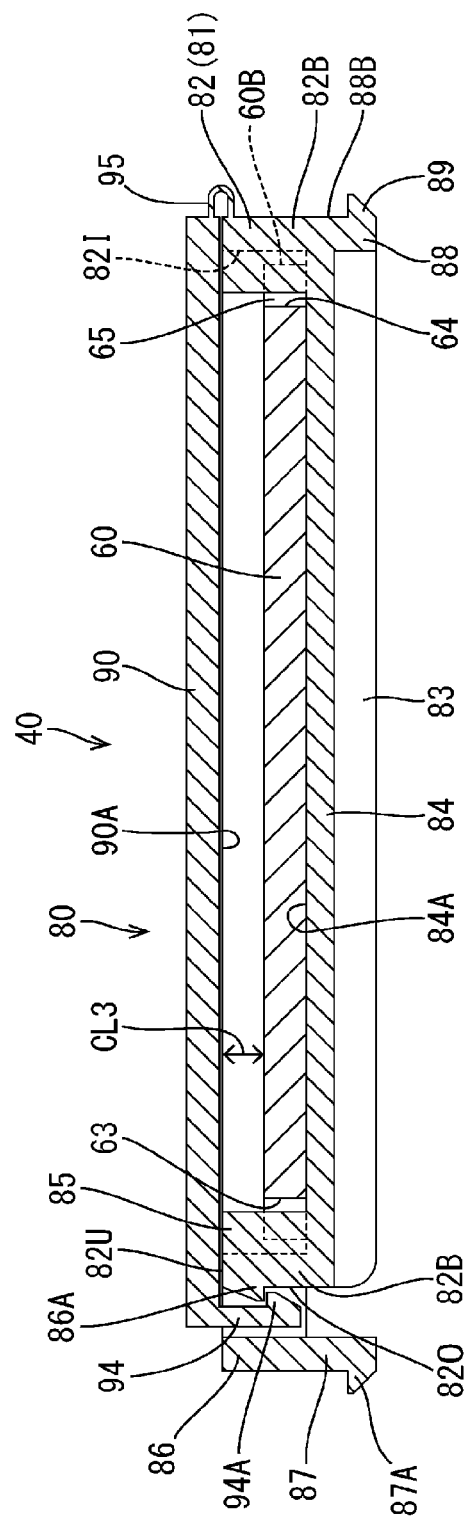
FIG. 13 is a cross-sectional view taken along the line C-C in FIG. 10.
Figure 15:
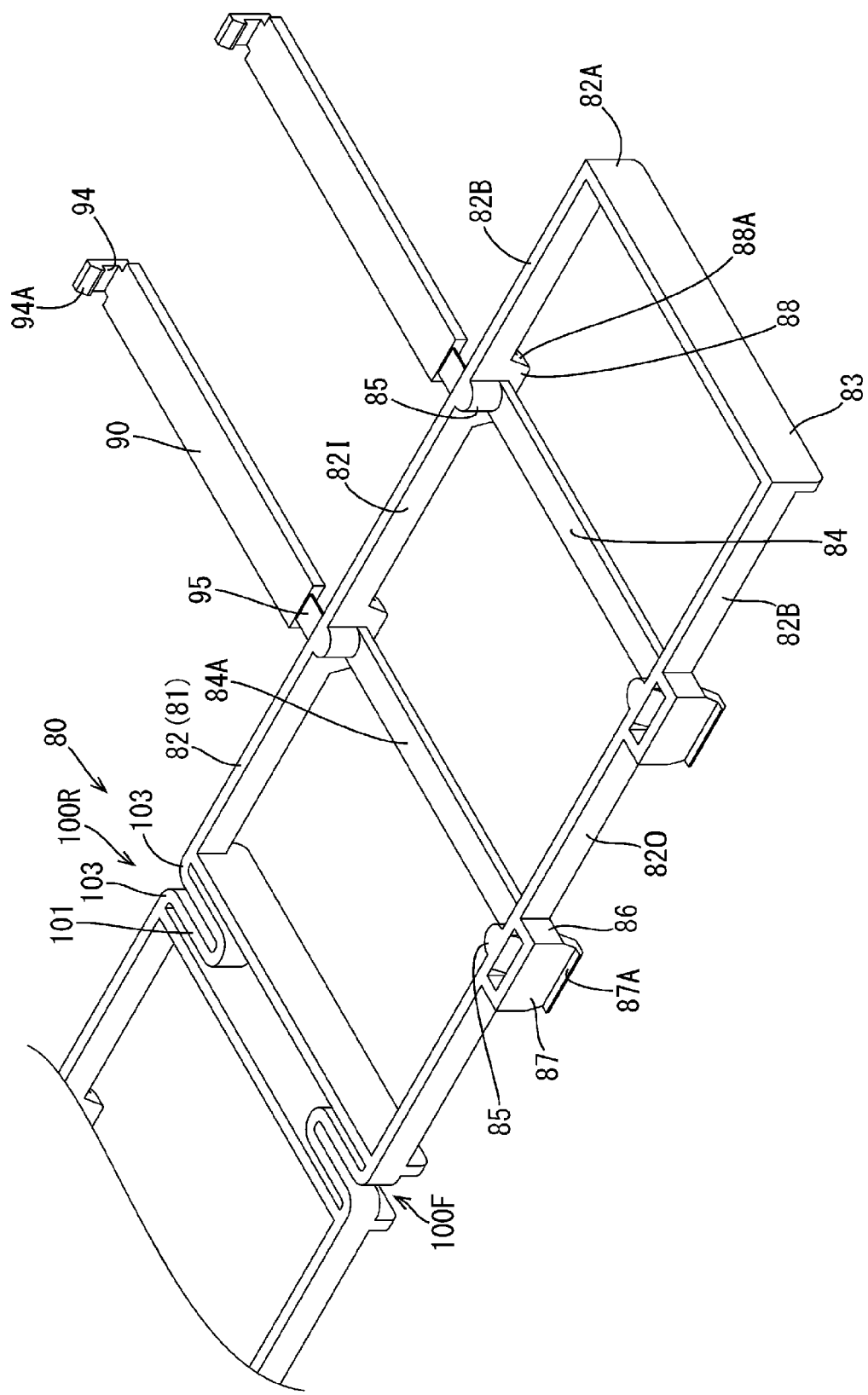
FIG. 15 is a perspective view showing a state before bus bars are disposed inside an accommodation frame.
Figure 16:
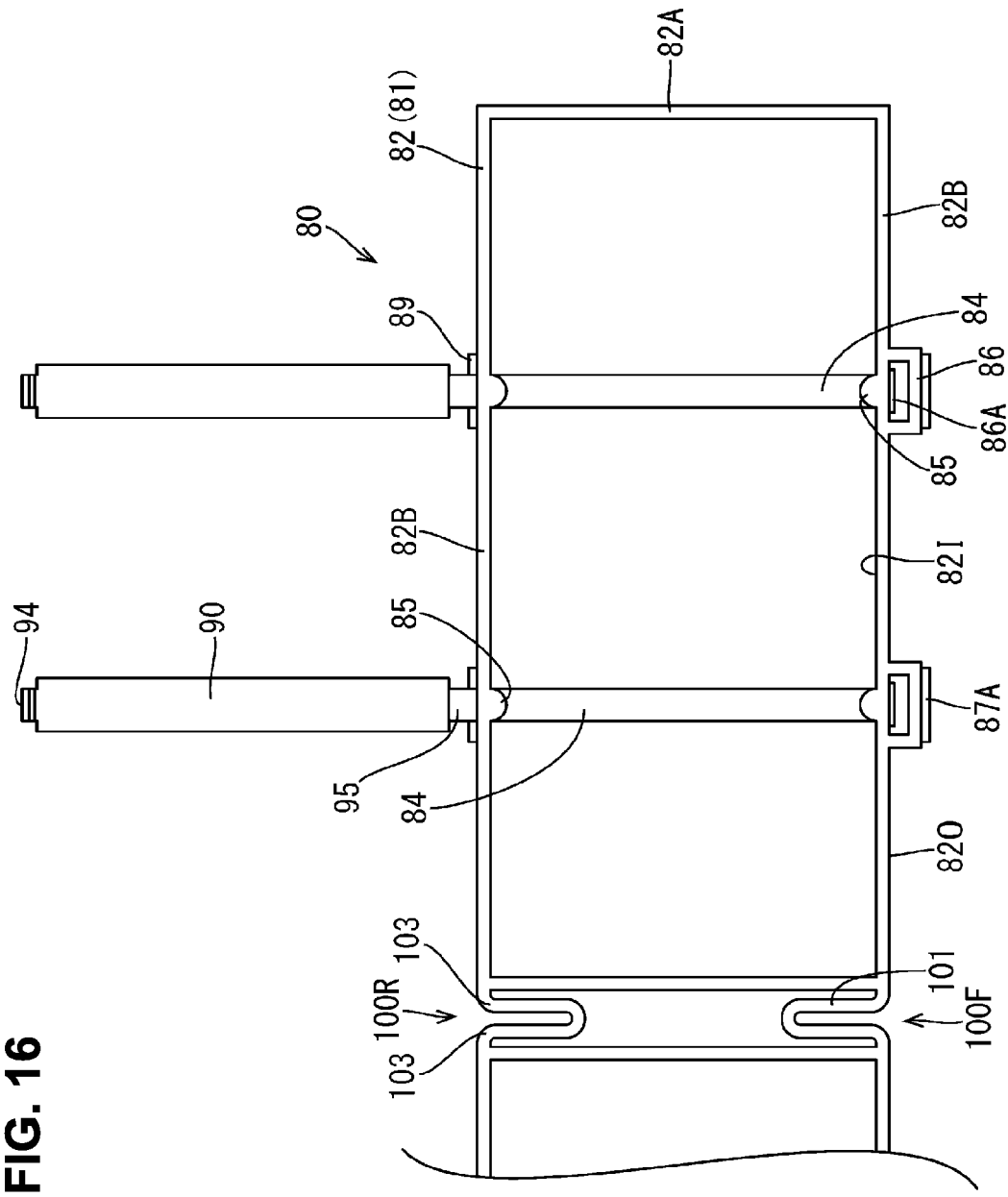
FIG. 16 is a plan view showing a state before bus bars are disposed inside the accommodation frame.
Figure 17:
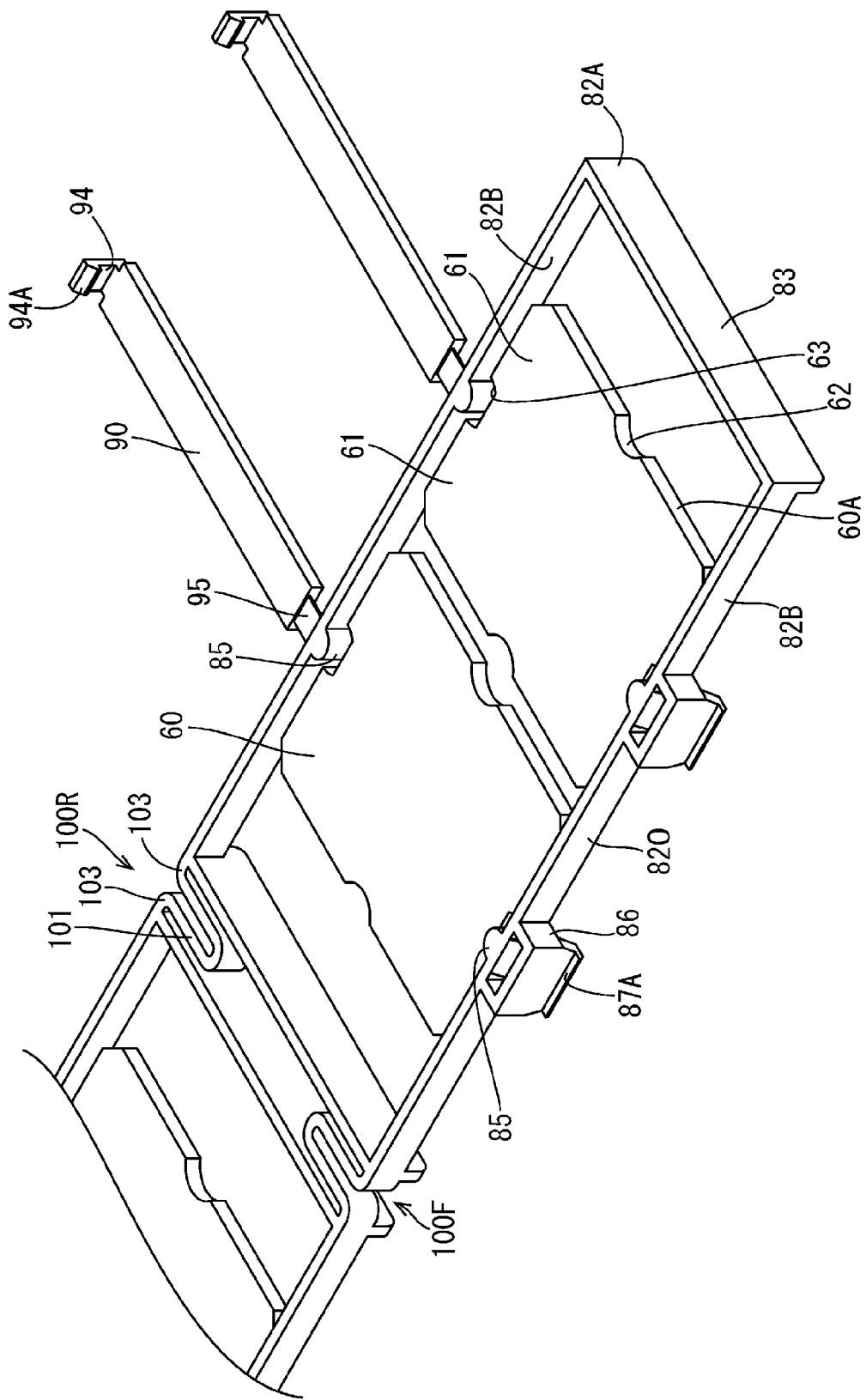
FIG. 17 is a perspective view showing a state before lid portions are mounted to an accommodation frame.
Figure 18:
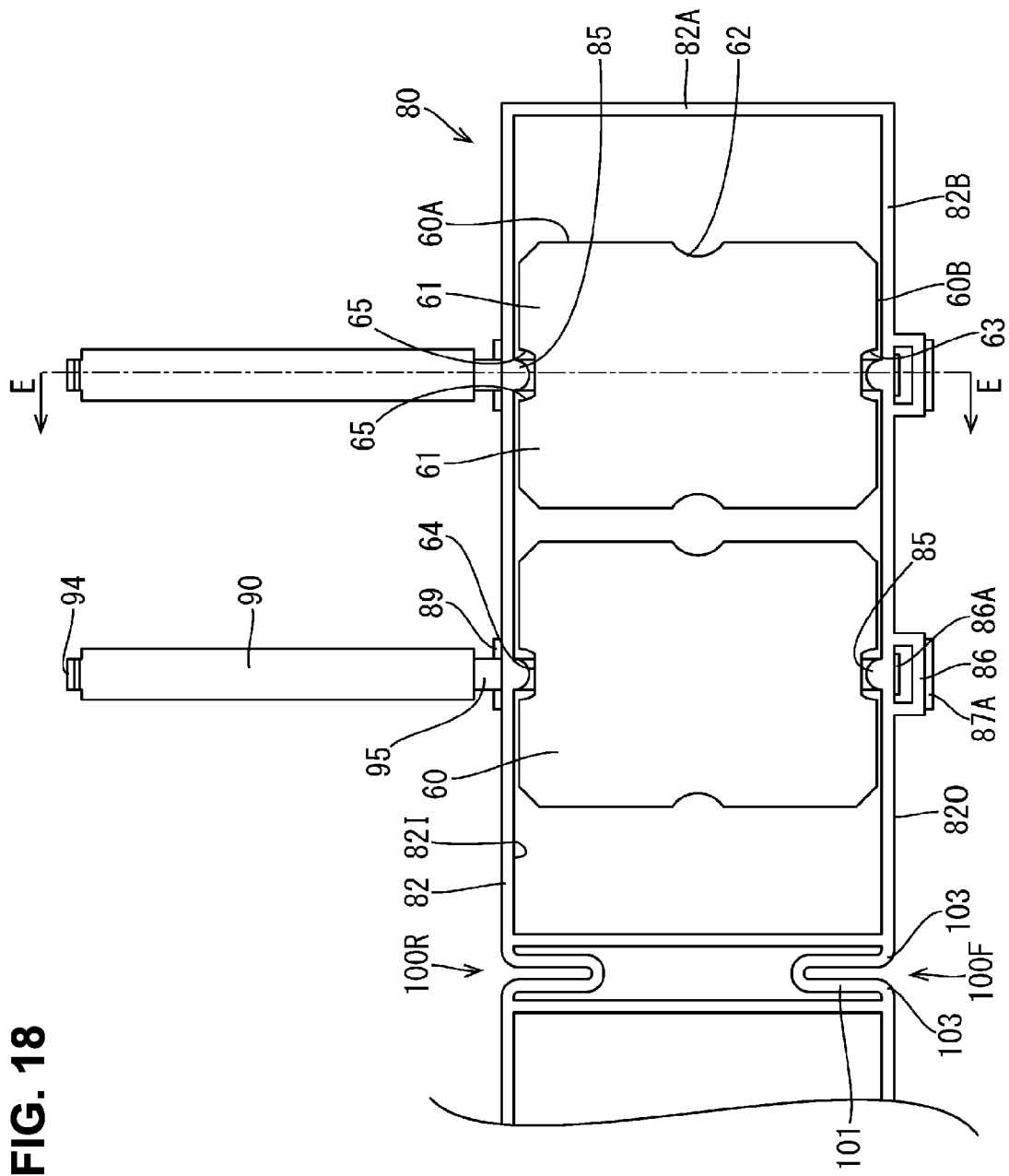
FIG. 18 is a plan view showing a state before lid portions are mounted to the accommodation frame.
Figure 19:
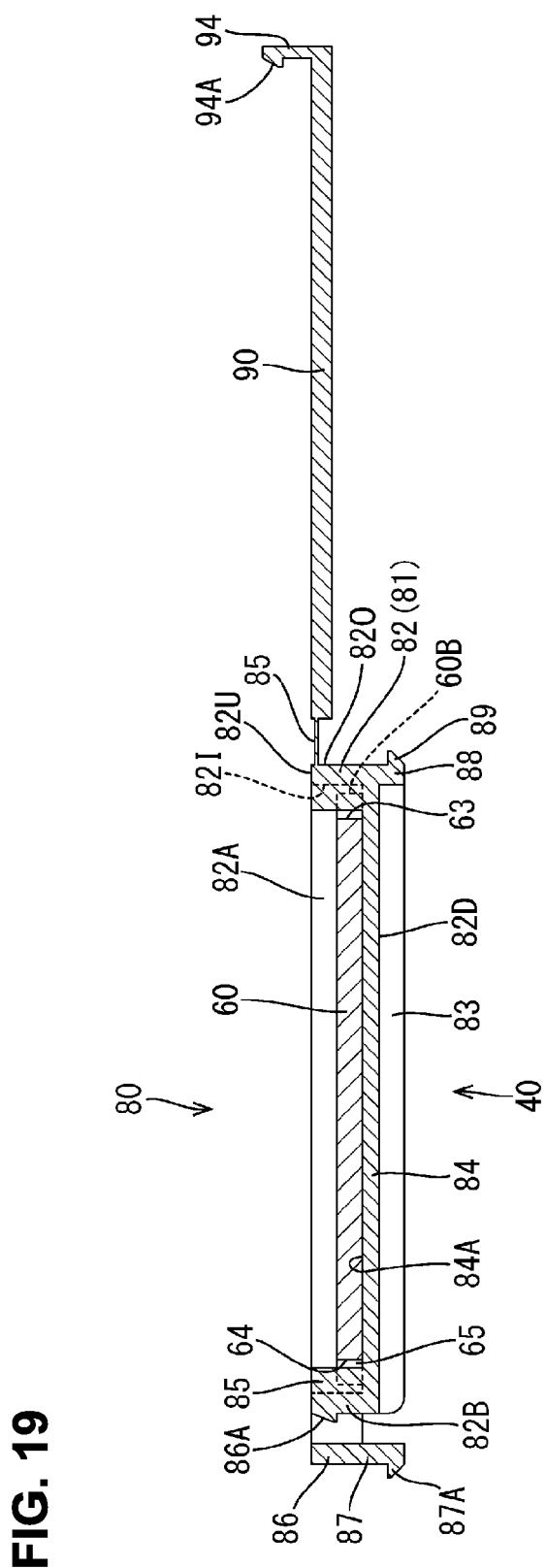
FIG. 19 is a cross-sectional view taken along the line E-E in FIG. 18.

As shown in FIGS. 15 and 16, each of the support portions 84 has a configuration that is oblong in the front-rear direction, and is provided parallel to the short-side walls 82A of the accommodation frame 82 so as to connect the long-side walls 82B of the accommodation frame 82, and to be continuous with a lower surface (an example of "second end face") 82D of the accommodation frame 82. As shown in FIG. 13, each of the support portions 84 supports a portion between the pair of terminal connection portions 61 of the bus bar 60, and is formed at a position where the upper surface 84A of the support portion 84 and the lower surface 82D of the accommodation frame 82 are coplanar with each other. That is, the support portions 84 support from below the substantially central portions of the bus bars 60 in the left-right direction such that the lower surfaces of the bus bars 60 and the lower surface 82D of the accommodation frame 82 are substantially flush with each other in a state in which the support portions 84 protrude below the accommodation frame 82, whereby the bus bars 60 are held inside the accommodation frame 82.

Each support portion 84 is configured to be disposed on the corresponding insulating separator 26 of the electricity storage element group 20 when the connection module 40 is attached to the electricity storage element group 20. Accordingly, the pair of terminal connection portions 61 of each bus bar 60 can be disposed on the electrode terminals 22 of the corresponding electricity storage elements 21.

On the other hand, a positioning projecting piece 88 that is fitted to each of the inter-element recesses 28 of the electricity storage element group 20 is provided protruding downward from the lower surface 82D of the accommodation frame 82 at a position adjacent to the support portion 84.

Figure 4:
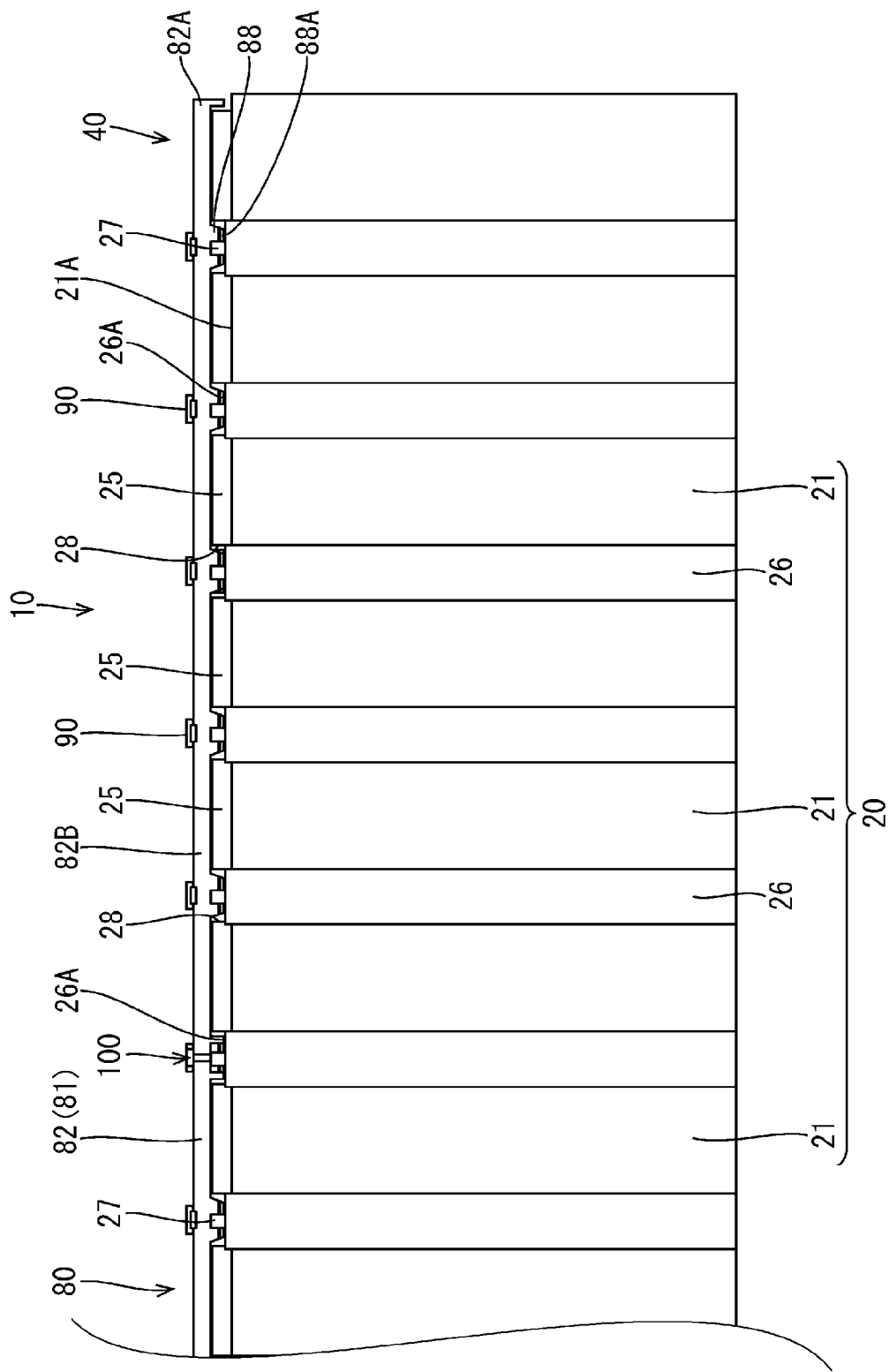
FIG. 4 is a side view of the electricity storage module.

As shown in FIGS. 4 and 13, each positioning projecting piece 88 has the shape of a plate protruding below the support portion 84 and having an inverse trapezoidal shape in a side view, and a protruding dimension L1 of the positioning projecting piece 88 from the accommodation frame 82 is set to be smaller than a depth dimension L2 of the inter-element recess 28 of the electricity storage element group 20.

The positioning projecting piece 88 is configured such that the positioning projecting piece 88 is guided into the inter-element recess 28 by inclined guide portions 88A provided on opposite side surfaces, respectively, of the positioning projecting piece 88 in the left-right direction when the connection module 40 is mounted to the electricity storage element group 20. Then, when the connection module 40 is mounted to the electricity storage element group 20, the positioning projecting piece 88 is fitted into the inter-element recess 28 from above in a state in which a gap is provided between the insulating support portion 25 and the upper surface 26A of the insulating separator 26.

Accordingly, in a state in which the connection module 40 is mounted to the electricity storage element group 20, the positioning projecting piece 88 and the insulating support portion 25 are locked to each other in the left-right direction, whereby the bus bar holding portions 81 can be prevented from being positionally displaced relative to the electrode terminals 22 in the left-right direction.

A held pawl 89 is provided on a lower-end outer surface 88B of the positioning projecting piece 88. At the lower end of the positioning projecting piece 88, the held pawl 89 protrudes outward, i.e., in a direction away from the positioning projecting piece 88, and is formed over the entire region of the lower end of the positioning projecting piece 88.

As shown in FIGS. 15 and 16, each lid portion 90 has a form that is oblong in the front-rear direction, and one end of the lid portion 90 is coupled to the accommodation frame 82 using a hinge 95.

The hinge 95 is formed so as to be continuous with the outer surface of a short-side portion 91 of the lid portion 90 and the outer surface of a long-side wall 82B of the accommodation frame 82, and the hinge 95 is formed at a position at which the lid portion 90 can be disposed so as to be opposed to the support portion 84 and the bus bar 60 by the hinge 95 being bent so as to be folded. When the hinge 95 is bent, an inner surface 90A of the lid portion 90 that is opposed to the support portion 84 and the bus bar 60 is disposed at a retaining completion position at which the inner surface 90A is also opposed to an upper surface (an example of "first end face") 82U of the accommodation frame 82 as shown in FIG. 13.

The width dimension of the lid portion 90 is set to be larger in the left-right direction than the width dimension of the support portion 84, and the lid portion 90 is disposed above the substantially central portion of the bus bar 60 in the left-right direction when the lid portion 90 is disposed at the retaining completion position, so that the bus bar 60 can be prevented from coming off upward inside the accommodation frame 82 by the lid portion 90.

A locking piece 94 that is locked to a locking frame 86 provided on the accommodation frame 82 is provided at the other end, which is opposite to the one end at which the hinge 95 is provided, of the lid portion 90.

The locking piece 94 is provided protruding from an outer surface of the lid portion 90 that is located opposite to the outer surface on which the hinge 95 is provided, and the locking piece 94 is configured to extend from the lid portion 90 toward the accommodation frame 82 in a state in which the hinge 95 is bent, as shown in FIG. 13. A locking pawl 94A protruding toward the hinge 95 side is provided at a distal end of the locking piece 94.

On the other hand, the locking frame 86 of the accommodation frame 82 is formed protruding in a substantially rectangular shape in a plan view, from the long-side wall 82B. A locked pawl 86A protruding toward the inside of the locking frame 86 is provided on an outer surface 82O of the long-side wall 82B inside the locking frame 86. When the lid portion 90 is disposed at the retaining completion position by bending the hinge 95, the distal end of the locking piece 94 is fitted inside the locking frame 86, and the locking pawl 94A of the locking piece 94 and the locked pawl 86A of the locking frame 86 are locked to each other in the up-down direction, whereby the lid portion 90 is held at the retaining completion position.

A positioning projecting piece 87 having the same shape as the positioning projecting piece 88 adjacent to the support portion 84 is provided at the lower end of the locking frame 86. The positioning projecting piece 87 is provided with a held pawl 87A protruding outward, i.e., in a direction away from the accommodation frame 82. The held pawl 87A is formed over the entire region of the lower end of the locking frame 86, and is configured to be locked, together with the held pawl 89 of the positioning projecting piece 88 of the accommodation frame 82, to holding portions 27 provided on the insulating separator 26.

Figure 3:
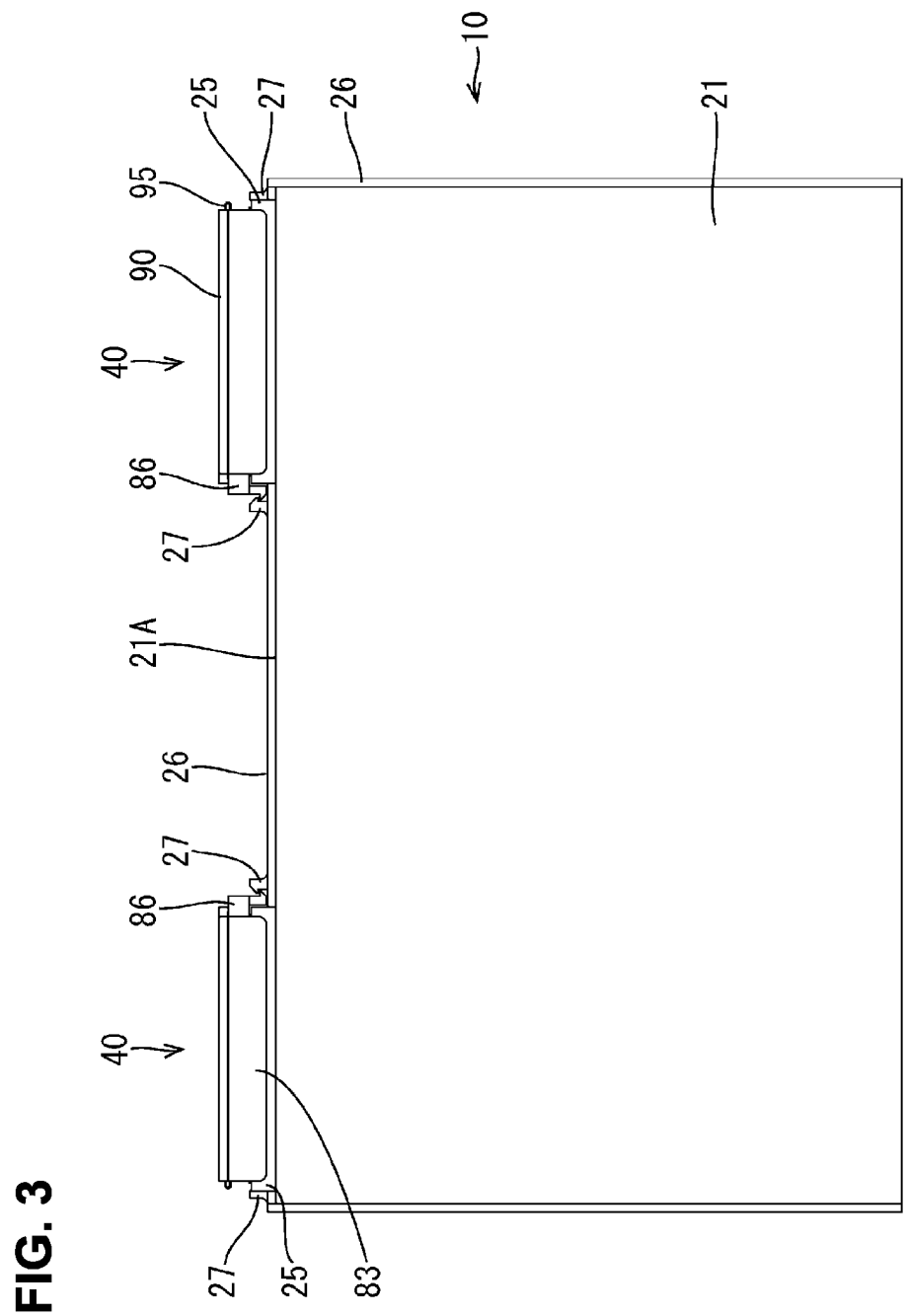
FIG. 3 is a front view of the electricity storage module.
Figure 7:
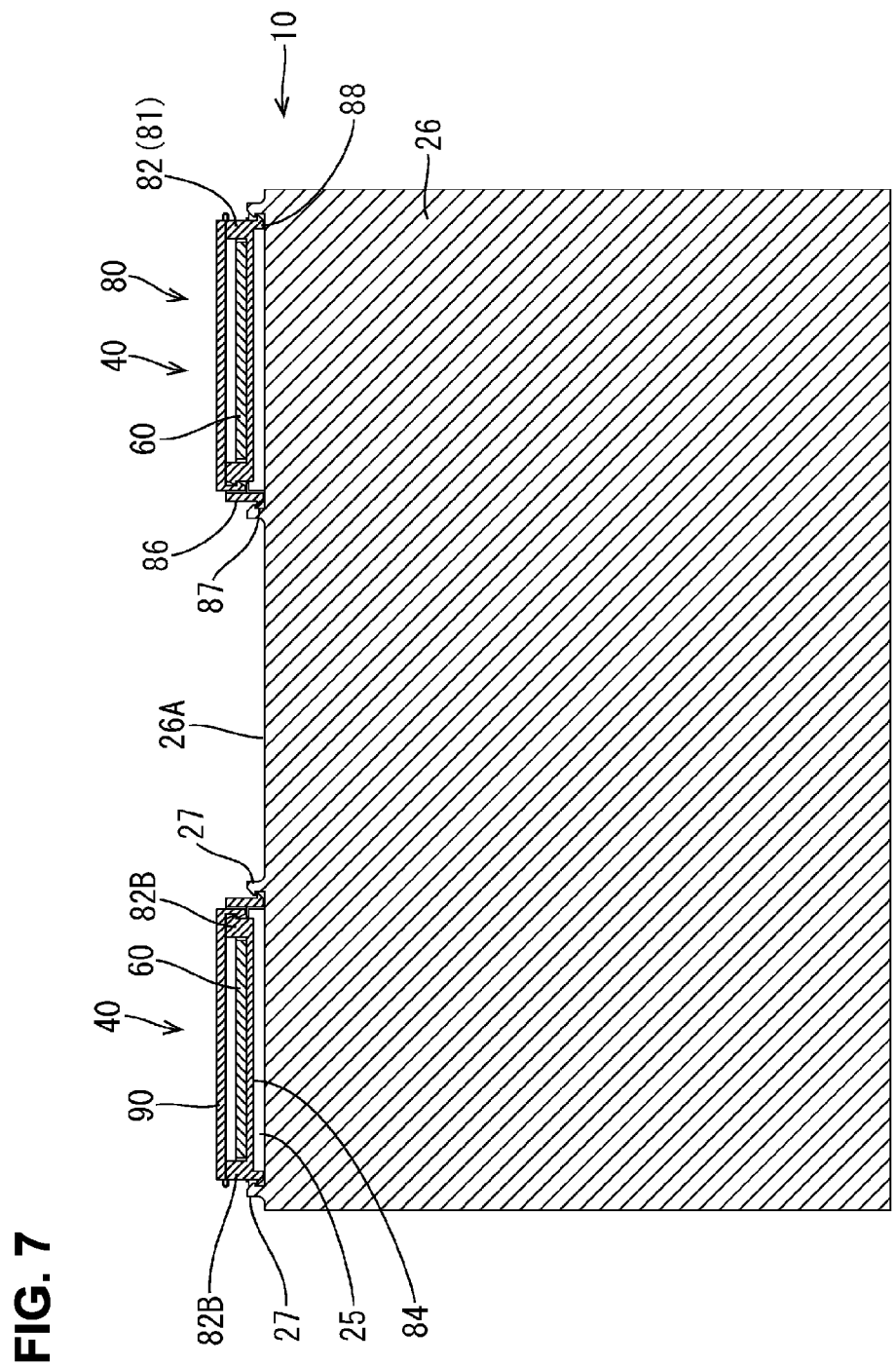
FIG. 7 is a cross-sectional view taken along the line B-B in FIG. 2.
Figure 8:
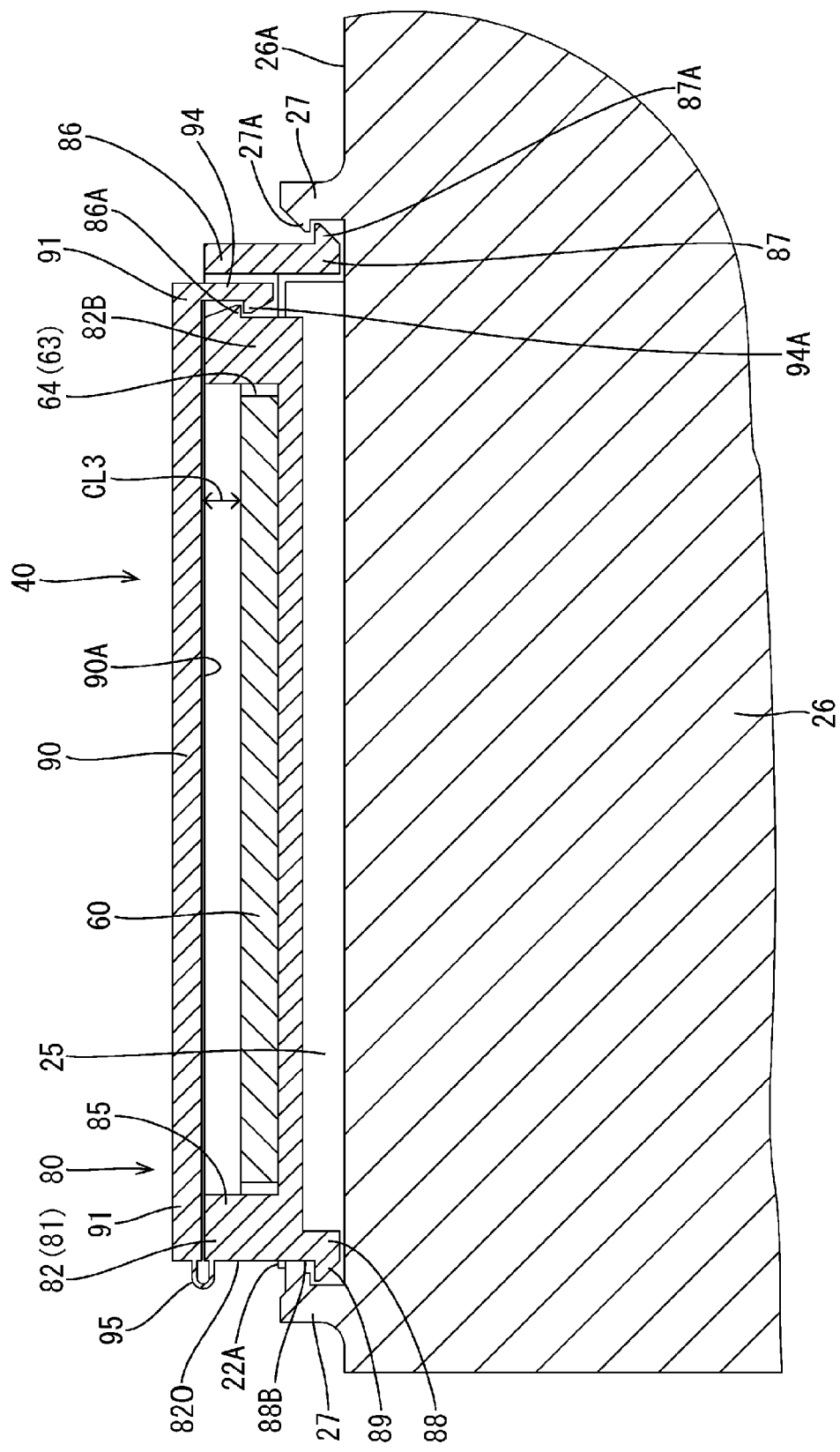
FIG. 8 is a partial enlarged cross-sectional view of FIG. 7.

As shown in FIGS. 3 and 7, each holding portion 27 of the insulating separator 26 has a form rising upward from the upper surface 26A of the insulating separator 26. One pair of holding portions 27 are provided on the front and rear sides of each of the positions at which the connection modules 40 are disposed, that is, the holding portions 27 are provided at a total of four positions of each of the insulating separators 26.

Each of the holding portions 27 includes a holding projection 27A protruding toward the connection module 40. When the connection module 40 is mounted to the electricity storage element group 20, the held pawls 87A and 89 of the positioning projecting pieces 87 and 88 and the holding projections 27A are locked to each other in the up-down direction, whereby the connection module 40 is fixed to the electricity storage element group 20.

Each coupling portion 100 is formed to be continuous with the bus bar holding portions 81 that are adjacent to each other in the arrangement direction (left-right direction) of the electricity storage elements 21.

As shown in FIGS. 2 and 10, a pair of coupling portions 100 are provided at the front and rear ends of a pair of opposing short-side walls 82A of the adjacent bus bar holding portions 81. Each coupling portion 100 is formed between the short-side walls 82A of the adjacent bus bar holding portions 81 at a position at which the coupling portion 100 does not protrude outward of the positions of the long-side walls 82B of the bus bar holding portions 81.

Each coupling portion 100 includes a bent portion 101 that is bent in the horizontal direction in a U-shape in a plan view, and a pair of proximal end portions 103 that are each continuous with an end portion of the bent portion 101 and the short-side wall 82A of one of the bus bar holding portions 81.

Figure 23:
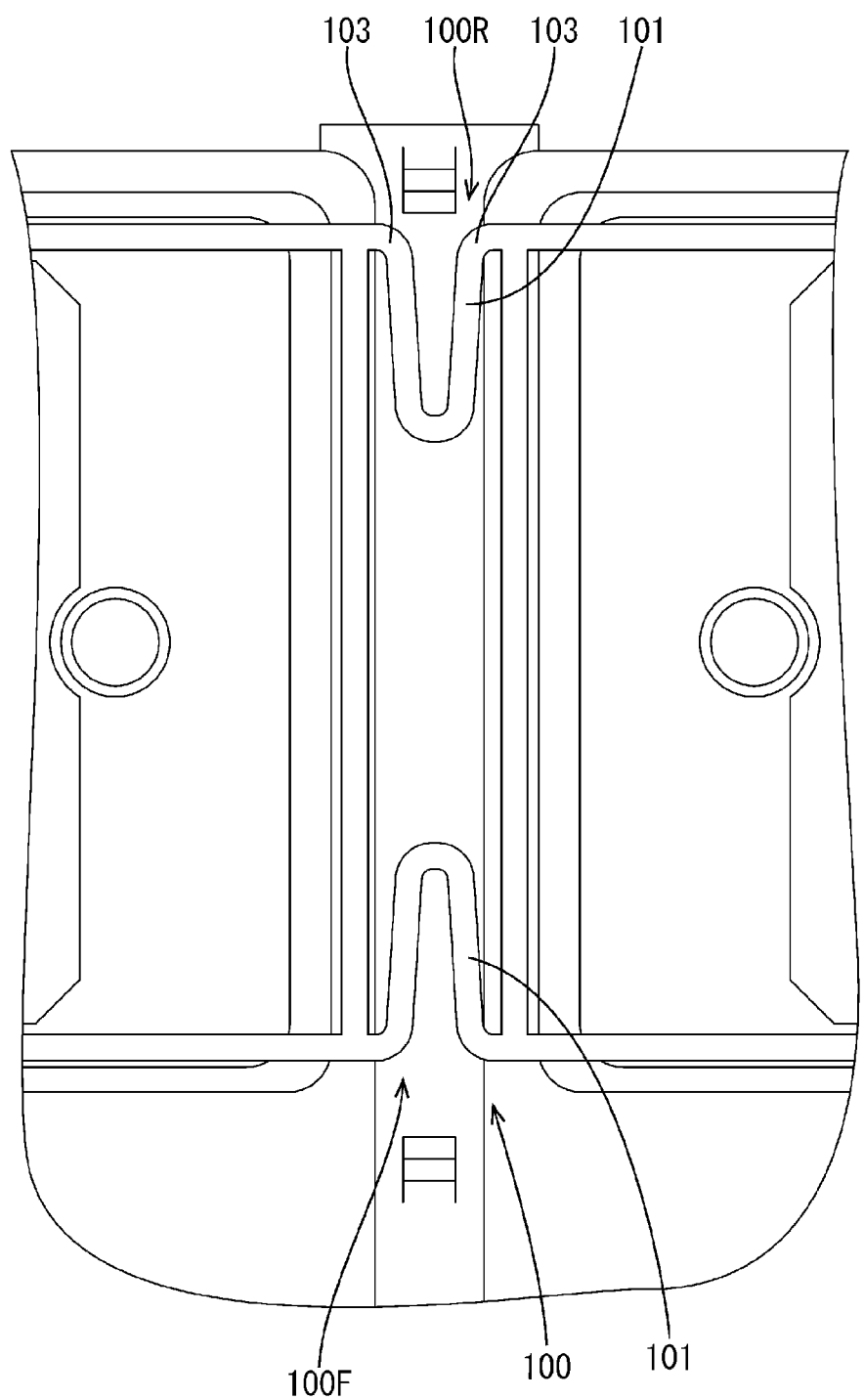
FIG. 23 is a partial enlarged plan view showing a state of a coupling portion according to the interval between the electrode terminals of adjacent electricity storage elements.

A front coupling portion 100F provided at the front end of the short-side walls 82A and a rear coupling portion 100R provided at the rear end of the short-side walls 82A are formed to be symmetrical in the front-rear direction with respect to the substantially central portion, in the front-rear direction, of the short-side walls 82A, and are configured such that the interval between the bus bar holding portions 81 can be varied by the bent portions 101 of the coupling portions 100 elastically expanding or contracting in the left-right direction as shown in FIG. 23.

The elastically expandable/contractible dimension of the bent portions 101 in the left-right direction is set to be larger than the maximum amount of positional displacement between the bus bar holding portions 81 that is caused when the electricity storage elements 21 are aligned in the left-right direction.

Figure 14:
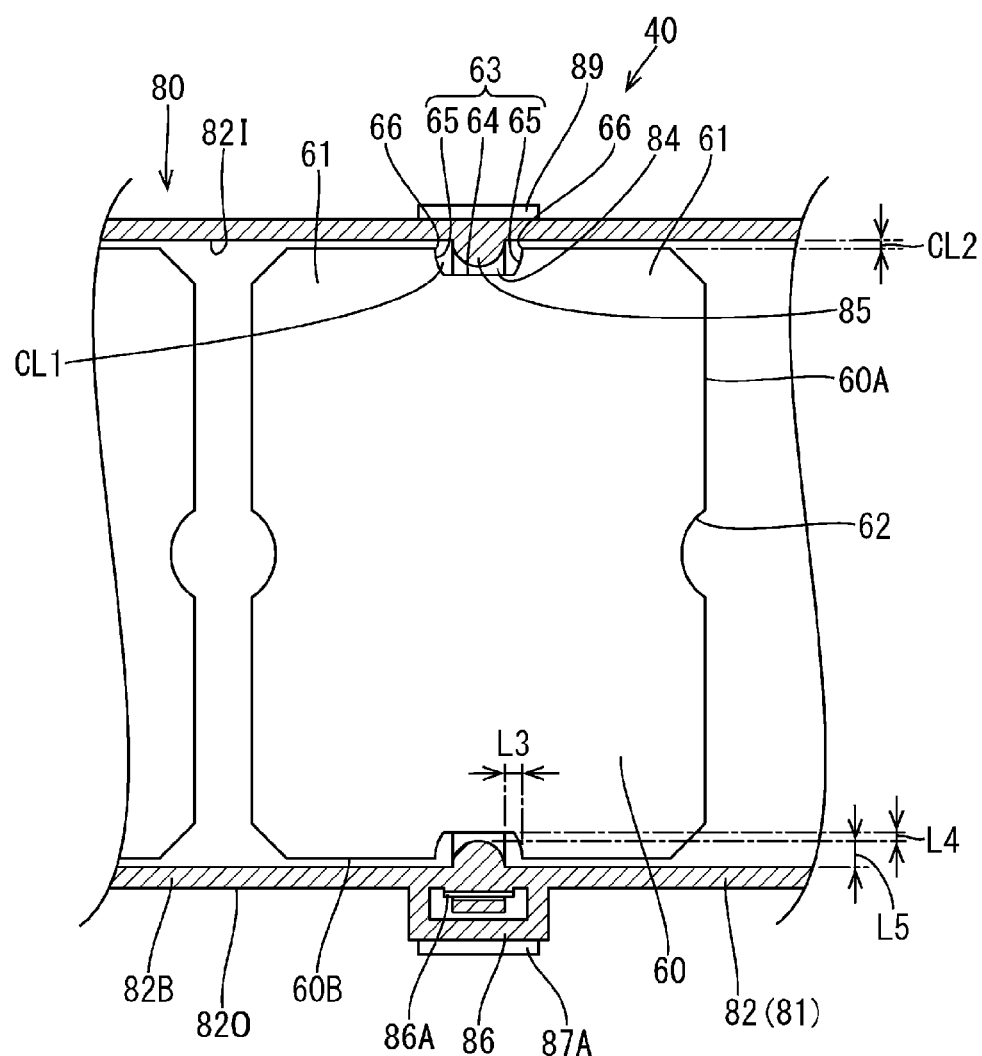
FIG. 14 is a cross-sectional view taken along the line D-D in FIG. 12.

As shown in FIG. 14, a plurality of retaining portions 85 that are fitted to a pair of fitting recesses 63 provided in each bus bar 60 are provided on inner surfaces 82I of the long-side walls 82B of the accommodation frame 82 of each bus bar holding portion 81.

Each of the fitting recesses 63 of each bus bar 60 is provided at the substantially central portion, in the left-right direction, of a lateral outer surface 60B of the bus bar 60. The fitting recess 63 has a shape that is recessed from the lateral outer surface 60B toward the center of the bus bar 60. The fitting recess 63 is composed of a straight portion 64 provided parallel to the corresponding longitudinal outer surfaces 60A, and curved portions 65 that are each provided in an circular arc shape so as to be continuous with an end portion of the straight portion 64 and the corresponding lateral outer surface 60B.

On the other hand, each retaining portion 85 is formed so as to be continuous with the corresponding support portion 84, inward of a position at which the hinge 95 is provided on the accommodation frame 82. In addition, each retaining portion 85 protrudes in a semicircular shape from the inner surface 821 of the corresponding long-side wall 82B toward the inside of the accommodation frame 82, and is formed in a semicylindrical shape extending from the upper surface 84A of the support portion 84 over the entire height of the short-side wall 82A.

In a state in which each bus bar 60 is accommodated inside the accommodation frame 82 and is disposed on the central portion, in the front-rear direction, of the corresponding support portion 84, a tolerance absorbing clearance CL1 is provided between the inner surface (the straight portion 64 and the curved portions 65) of the fitting recess 63 of the bus bar 60 and the retaining portion 85 as shown in FIG. 14. The tolerance absorbing clearance CL1 is set such that a length dimension L3 in the left-right direction between the retaining portion 85 and a corner portion 66 at which the curved portion 65 and the lateral outer surface 60B of the bus bar 60 are continuous with each other is larger than a length dimension L4 in the front-rear direction between the retaining portion 85 and the straight portion 64. Also, at any position, the tolerance absorbing clearance CL1 is set to be larger than the length dimension of an accommodating clearance CL2, which is a gap between the inner surface 821 of the long-side wall 82B and the lateral outer surface 60B of the bus bar 60. On the other hand, a protruding dimension L5 of the retaining portion 85 protruding from the inner surface 821 of the long-side wall 82B toward the inside of the accommodation frame 82 is set to be larger than the accommodating clearance CL2.

In a state in which the bus bar 60 inside the accommodation frame 82 is disposed above the support portion 84 as a result of the lid portion 90 having been closed, a height absorbing clearance CL3 is provided between the inner surface (the upper end position of the retaining portion 85) 90A of the lid portion 90 and the upper surface of the bus bar 60 as shown in FIG. 13. The height absorbing clearance CL3 is set to be larger than the maximum amount of variations in the height position between the electrode terminals 22 of the adjacent electricity storage elements 21. Also, the length dimension L3 between the corner portion 66 of the bus bar 60 and the retaining portion 85 of the bus bar holding portion 81 in the tolerance absorbing clearance CL1 is set to have a size with which, when one of the terminal connection portions 61 of the bus bar 60 is disposed, for example, on the upper surface (an example of "first end face") 82U of the accommodation frame 82, the other terminal connection portion 61 of the bus bar 60 can be disposed on the lower surface (an example of "second end face") 82D of the accommodation frame 82.

That is, although each bus bar 60 is movable forward, rearward, leftward, or rightward within the range of the tolerance absorbing clearance CL1 when the bus bar 60 is supported from below by the support portion 84 inside the accommodation frame 82, the curved portions 65 of the fitting recess 63 of the bus bar 60 and the retaining portion 85 are locked to each other in the left-right direction, whereby the bus bar 60 is held inside the accommodation frame 82 in a state in which it is prevented from coming off in the left-right direction.

Also in the case where the bus bar 60 is inclined so as to displace the opposite ends thereof in the left-right direction inside the accommodation frame 82, the retaining portion 85 will not obstruct the inclination of the bus bar 60.

The present embodiment has the configuration described above. Next, the operation and effects of the connection module 40 will be described.

In the connection module 40 of the present embodiment, each bus bar 60 is disposed so as to have a tolerance absorbing clearance CL1 between itself and the retaining portions 85 of the bus bar holding portion 81 and a clearance between itself and each of the protrusions 24 of the electrode terminals 22, and the bus bar 60 is movable in the arrangement direction of the electricity storage elements 21 in the clearances. In addition, each of the terminal connection portions 61 of the bus bar 60 is set to be larger than the sum of the maximum amount of variations in the inter-electrode pitch between the adjacent electricity storage elements 21 and the length dimension of a region of the corresponding electrode terminal 22 that is connected to the terminal connection portion 61.

That is, even when an error arises in the inter-electrode pitch between the adjacent electricity storage elements 21 due to variations in dimensional accuracy of the electricity storage elements 21 connected by the bus bars 60 accommodated in the same bus bar holding portion 81, the bus bars 60 can move in the arrangement direction of the electricity storage elements 21 in the clearances. Accordingly, the adjacent electricity storage elements 21 can be reliably connected to each other by the bus bars 60.

Although each of the bus bar holding portions 81 is positioned in the corresponding inter-element recess 28 of the electricity storage element group 20 by the positioning projecting pieces 87 and 88, the bus bar holding portions 81 that are adjacent to each other in the left-right direction are coupled by the coupling portions 100 capable of expanding/contracting in the left-right direction. Accordingly, even when the accumulated error of the inter-electrode pitch that arises between the bus bar holding portions 81 is increased due to variations in dimensional accuracy of the electricity storage elements 21, the accumulated error of the inter-electrode pitch that arises between the bus bar holding portions 81 can be absorbed by the coupling portions 100 expanding or contracting in the left-right direction as shown in FIG. 23. This can prevent an attachment operation failure due to the dimensional error or the like in the arrangement direction of the electricity storage elements 21 when performing an operation of attaching the connection module 40 to the electricity storage element group 20.

Meanwhile, the electricity storage elements 21 may undergo variations in dimensional accuracy also for the height positions of the electrode terminals 22. However, according to the present embodiment, the height absorbing clearance CL3 is provided between the bus bar 60 accommodated inside the accommodation frame 82 and the inner surface (upper end position of the retaining portion 85) 90A of the lid portion 90. In addition, the length dimension L3 between the corner portion 66 of the bus bar 60 and the retaining portion 85 of the bus bar holding portion 81 in the tolerance absorbing clearance CL1 is set to have a size with which, even when the bus bar 60 is most inclined in the left-right direction inside the accommodation frame, the retaining portions 85 will not obstruct the inclination of the bus bar 60.

Figure 22:
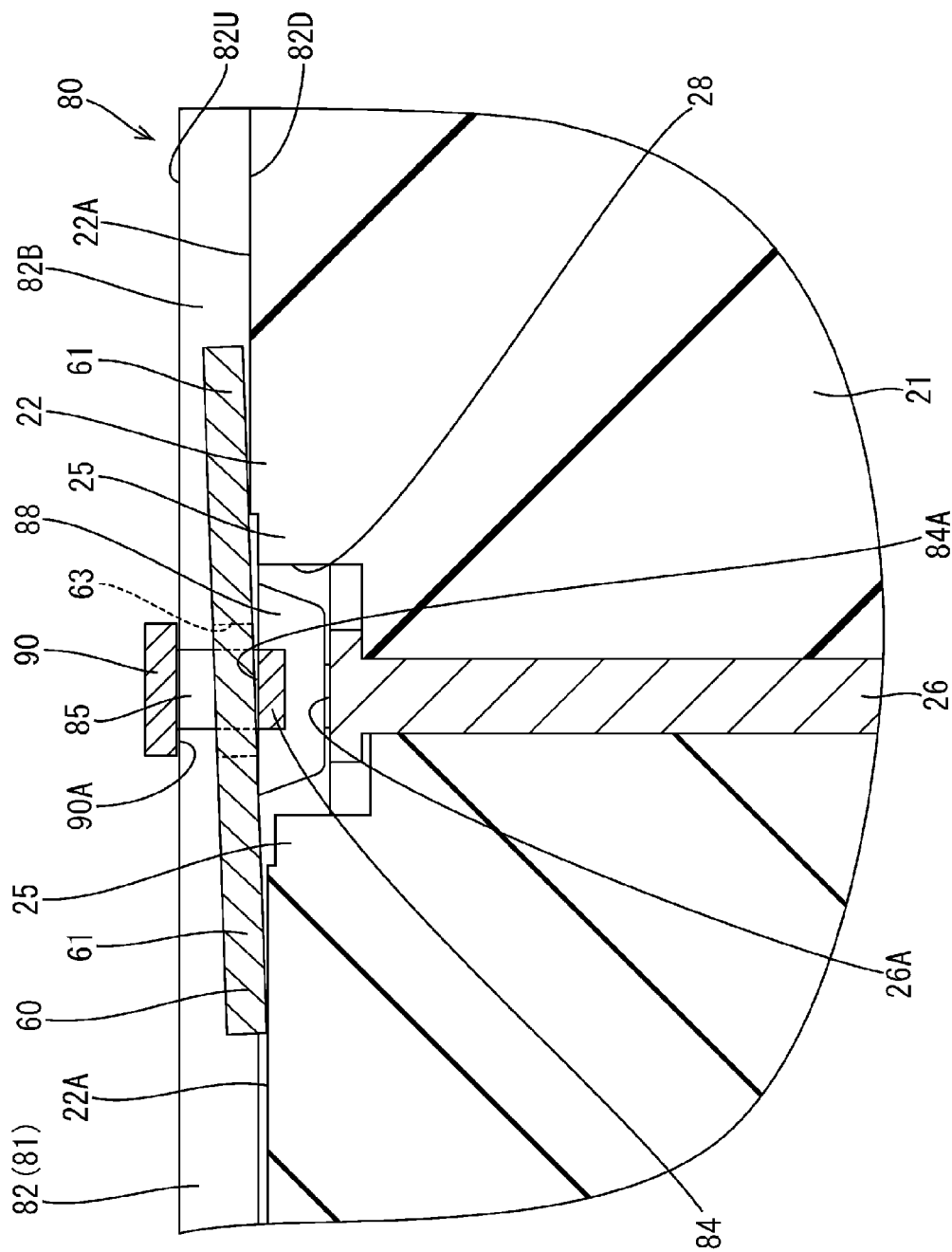
FIG. 22 is a partial enlarged cross-sectional view showing a state of a bus bar according to the heights of the electrode terminals of adjacent electricity storage elements, the partial enlarged cross-sectional view corresponding to the cross section shown in FIG. 6.

In other words, even when positional displacement occurs for the height positions of the electrode terminals 22 of the adjacent electricity storage elements 21 due to a dimensional error of the electricity storage elements 21, the positional displacement of the electrode terminals 22 between the adjacent electricity storage elements can be absorbed by the bus bar 60 being inclined in the left-right direction inside the accommodation frame, and the respective terminal connection portions 61 of the bus bar 60 can be placed on the electrode terminals 22 of the adjacent electricity storage elements 21, as shown in FIG. 22.

That is, according to the present embodiment, it is possible to prevent not only a dimensional error in the arrangement direction of the electricity storage elements 21, but also an attachment operation failure due to a dimensional error or the like in the height direction of the electrode terminals 22 of the electricity storage elements 21, when performing an operation of attaching the connection module 40 to the electricity storage element group 20.

The retaining portions 85 are provided over the entire height of the accommodation frame 82 so as to protrude inward from the inner surfaces 821 of the long-side walls 82B of the accommodation frame 82, and a pair of fitting recesses 63 to which the retaining portions 85 are fitted are provided at a substantially central portion, in the left-right direction, of the lateral outer surfaces 60B of the bus bar 60.

Meanwhile, it is conceivable to adopt means for retaining the bus bar by the retaining portions, for example, by providing fitting projections on the bus bar, and providing, in the inner surfaces of the accommodation frame, fitting grooves to which the fitting projections are fitted. However, in the case of forming fitting grooves in the accommodation frame, the plate thickness of the accommodation frame needs to be larger than the depth dimension of the fitting grooves, resulting in an increase in the size of the accommodation frame and hence the size of the insulating protector. In contrast, according to the present embodiment, the fitting recesses 63 of the bus bar 60 are fitted to the retaining portions 85 protruding from the accommodation frame 82, and it is therefore possible to prevent the bus bar 60 from coming off in the left-right direction by the retaining portions 85, while suppressing an increase in the size of the accommodation frame 82.

Each of the retaining portions 85 has a semicylindrical shape with a protruding surface having a circular arc shape, and each of the fitting recesses 63 of the bus bar 60 is recessed so as to extend along the protruding surface of the corresponding retaining portions 85. Accordingly, the retaining portions 85 allow the bus bar 60 to be more smoothly moved in the up-down direction along the retaining portions 85 as compared with a case where retaining portions have an angular protruding surface, for example.

Each of the coupling portions 100 is provided between and so as to be continuous with a pair of opposing short-side walls 82A of the adjacent accommodation frames 82, and is disposed so as to be bent between the adjacent accommodation frames 82. Accordingly, it is possible to suppress an increase in the size of the connection module 40 and hence the size of the electricity storage module 10 as compared with, for example, a case where the coupling portions protrude outward from between the accommodation frames.

The coupling portions 100 are respectively provided at the front and rear ends of the short-side walls 82A of the accommodation frames 82. Accordingly, as compared with a case where the coupling portions are provided at only one end of the short-side walls, for example, it is possible to prevent the coupling portions 100 from being damaged due to plastic deformation or the like as a result of the accommodation frames 82 opening so as to move away from each other.

Other Embodiments

The technique disclosed in the present specification is not limited to the embodiments described and illustrated above, and includes, for example, various embodiment as follows.

(1) In the above embodiment, electricity storage units each including three electricity storage elements 21 connected in parallel are connected in series by two connection modules 40. However, the disclosed technique is not limited thereto, and it is possible to adopt a configuration in which all electricity storage elements are connected in series by changing the number of bus bars held by the bus bar holding portion, or a configuration in which electricity storage units each including two, or four or more electricity storage elements connected in parallel are connected in series.

(2) In the above embodiment, each coupling portion 100 include bent portions 101 that are bent in the horizontal direction. However, the disclosed technique is not limited thereto, and it is possible to adopt a configuration in which each coupling portion includes bent portions that are bent in the vertical direction.

LIST OF REFERENCE NUMERALS

20 Electricity storage element group
21 Electricity storage element
22 Electrode terminal
25 Insulating support portion
40 Connection module
60 Bus bar
61 Terminal connection portion
63 Fitting recess
80 Insulating protector
82 Accommodation frame
82A Short-side wall (example of "wall portion")
82U Upper surface of accommodation frame (example of "first end face")
82D Lower surface of accommodation frame (example of "second end face")
85 Retaining portion
87, 88 Positioning portion
100 Coupling portion
CL1 Tolerance absorbing clearance (example of "clearance")
CL3 Height-direction clearance (corresponding to "dimensional difference between height dimension of retaining portion and thickness dimension of bus bar")

The invention claimed is:

1. A connection module configured to be attached to an electricity storage element group in which a plurality of electricity storage elements each including a positive electrode terminal and a negative electrode terminal are arranged in a first direction, the connection module comprising:
   a bus bar including a pair of terminal connection portions configured to be respectively placed on the electrode terminals of adjacent electricity storage elements, and being configured to electrically connect the adjacent electricity storage elements by the pair of terminal connection portions being connected to the electrode terminals; and
   an insulating protector configured to be fixed to the electricity storage element group while holding the bus bar,
   wherein the insulating protector includes:
     an accommodation frame inside of which the bus bar is disposed, the accommodation frame including a pair of inner surfaces that face each other in a second direction, the second direction being orthogonal to the first direction,
     a pair of retaining portions that prevent the bus bar from coming off in the first direction inside the accommodation frame, the pair of retaining portions protruding inward from the pair of inner surfaces of the accommodation frame, and a lid portion that prevents the bus bar accommodated inside the accommodation frame from coming off in a height direction, the height direction being orthogonal to the first direction and the second direction, the lid portion having an elongated shape extending in the second direction and being provided on upper surfaces of the pair of the retaining portions in the height direction and extending between the pair of retaining portions, and a clearance is provided between each of the pair of retaining portions and the bus bar, the clearance being configured such that, in a state in which one of the terminal connection portions of the bus bar inside the accommodation frame is disposed on a first end face of the accommodation frame in the height direction, the other terminal connection portion of the bus bar can be disposed on a second end face of the accommodation frame in the height direction, the second end face being located on the electrode terminal side in the height direction and being located opposite to the first end face.

2. The connection module according to claim 1, wherein each of the pair of retaining portions extend over an entire height of the accommodation frame, and a pair of fitting recesses to which the pair of retaining portions are fitted are provided at a central portion, in the first direction, of side surfaces of the bus bar that are opposed to the pair of inner surfaces.

3. The connection module according to claim 2, wherein a dimensional difference between a height dimension of each of the pair of retaining portions and a thickness dimension of the bus bar is set to be larger than a difference between height positions of portions of the electrode terminals of the adjacent electricity storage elements where the bus bar is to be disposed.

4. The connection module according to claim 2, wherein each of the pair of retaining portions has a semicylindrical shape with a protruding surface having a circular arc shape, and each of the pair of fitting recesses is recessed so as to extend along the protruding surface of a corresponding retaining portion.

5. The connection module according to claim 1, each electrode terminal includes a flat portion and a protrusion protruding upward in the height direction from the flat portion, the bus bar includes positioning recesses that are recessed from the edges of the bus bar extending in the second direction toward a center of the bus bar in the first direction, and the protrusion of the electrode terminal is fitted to the positioning recess.

6. An electricity storage module comprising:

the electricity storage element group in which the plurality of electricity storage elements each including the positive and the negative electrode terminal are arranged in the first direction; and the connection module according to claim 1, wherein each of the plurality of electricity storage elements includes an insulating support portion that surrounds and supports the electrode terminals, the accommodation frame is provided with a positioning portion configured to be fitted between the insulating support portions of the adjacent electricity storage elements so as to position the accommodation frame relative to the plurality of electricity storage elements, and the insulating protector is provided so as to be continuous with adjacent accommodation frames, and includes coupling portions configured to expand or contract in the first direction when the accommodation frames are positioned relative to the plurality of electricity storage elements.

7. The electricity storage module according to claim 6, wherein each of the coupling portions is provided between and so as to be continuous with a pair of opposing wall portions of the adjacent accommodation frames, and is disposed so as to be bent between the adjacent accommodation frames.

8. The electricity storage module according to claim 7, wherein the coupling portions are respectively provided at opposite ends of the pair of wall portions of the accommodation frames.

* * * * *